US011301939B2

(12) United States Patent
Haas et al.

(10) Patent No.: US 11,301,939 B2
(45) Date of Patent: Apr. 12, 2022

(54) SYSTEM FOR GENERATING SHAREABLE USER INTERFACES USING PURCHASE HISTORY DATA

(71) Applicant: GIST TECHNOLOGY INC., San Francisco, CA (US)

(72) Inventors: Walter A. Haas, San Francisco, CA (US); Shoaib Ghouse Mohideen Khan, Bangalore (IN)

(73) Assignee: GIST TECHNOLOGY INC., San Francisco, CA (US)

( * ) Notice: Subject to any disclaimer, the term of this patent is extended or adjusted under 35 U.S.C. 154(b) by 71 days.

(21) Appl. No.: 16/399,749

(22) Filed: Apr. 30, 2019

(65) Prior Publication Data
US 2019/0340700 A1 Nov. 7, 2019

Related U.S. Application Data

(60) Provisional application No. 62/665,871, filed on May 2, 2018.

(51) Int. Cl.
*G06Q 40/00* (2012.01)
*G06F 3/0482* (2013.01)
(52) U.S. Cl.
CPC ........... *G06Q 40/12* (2013.12); *G06F 3/0482* (2013.01)
(58) Field of Classification Search
CPC .............................. G06Q 40/12; G06F 3/0482
See application file for complete search history.

(56) References Cited

U.S. PATENT DOCUMENTS 7,478,054 B1    1/2009  Adams et al.
8,250,139 B2    8/2012  Ahuja et al.
                (Continued)

FOREIGN PATENT DOCUMENTS

CA    3038124 A1  *  4/2018   ......... G06Q 30/0283
GB    2488237 A   *  8/2012   ............... G06T 7/11
KR    20160132457 A * 11/2016  ........... G06F 3/0482

OTHER PUBLICATIONS

Zhu, Lei, Izak Benbasat, and Zhenhui Jiang. "Let's Shop Online Together: An Empirical Investigation of Collaborative Online Shopping Support." Information systems research 21.4 (2010): 872-891. Web. (Year: 2010).*

(Continued)

*Primary Examiner* — Ashford S Hayles
(74) *Attorney, Agent, or Firm* — Lindauer Law, PLLC

(57) ABSTRACT

Purchase history data from one or more sources, such as communication servers, websites, and point of sale systems, is used to determine items that were purchased. Item data for the purchased items is used to determine the characteristics of the items. A user interface is generated that presents at least a portion of the item characteristics, which may include images of items that have been provided with a complementary background color to provide the user interface with a uniform appearance. User input may select a portion of the items for inclusion in a user interface that is accessible to other users. The user may be notified if another user purchases an item using the user interface or after viewing the user interface. The user interface may include links that enable a user to initiate a purchase or navigate to a website associated with an item or seller.

20 Claims, 10 Drawing Sheets

(56) References Cited

U.S. PATENT DOCUMENTS

| | | | |
|---|---|---|---|
| 8,655,746 B1* | 2/2014 | Mussman | G06Q 30/0252 |
| | | | 705/26.7 |
| 9,224,167 B2* | 12/2015 | Lampert | G06Q 30/0633 |
| 9,299,099 B1* | 3/2016 | Jayaram | G06Q 30/0631 |
| 9,818,145 B1* | 11/2017 | Finkelstein | G06Q 30/0631 |
| 10,319,024 B2* | 6/2019 | Bueno Lobl | G06Q 30/0613 |
| 2010/0057586 A1* | 3/2010 | Chow | G06Q 30/0601 |
| | | | 705/26.1 |
| 2010/0114957 A1* | 5/2010 | Benson | G06Q 30/0631 |
| | | | 707/780 |
| 2010/0280920 A1 | 11/2010 | Scott et al. | |
| 2011/0029403 A1* | 2/2011 | Xu | G06Q 30/00 |
| | | | 705/26.7 |
| 2011/0173094 A1* | 7/2011 | Krueger | G06Q 30/08 |
| | | | 705/26.41 |
| 2013/0030949 A1* | 1/2013 | Sundaresan | G06Q 50/01 |
| | | | 705/26.7 |
| 2013/0084000 A1 | 4/2013 | Bhardwaj et al. | |
| 2013/0085869 A1* | 4/2013 | Carlson | G06Q 30/0207 |
| | | | 705/14.72 |
| 2013/0144707 A1* | 6/2013 | Isaacson | G06Q 30/0224 |
| | | | 705/14.28 |
| 2013/0215116 A1* | 8/2013 | Siddique | G06Q 20/204 |
| | | | 345/420 |
| 2013/0268302 A1* | 10/2013 | Jayaram | G06Q 30/06 |
| | | | 705/5 |
| 2014/0033317 A1 | 1/2014 | Barber | |
| 2014/0089135 A1* | 3/2014 | Linh | G06Q 30/0643 |
| | | | 705/26.7 |
| 2014/0129292 A1* | 5/2014 | Ruvini | G06Q 30/0282 |
| | | | 705/7.34 |
| 2014/0180872 A1* | 6/2014 | Gura | G06Q 10/107 |
| | | | 705/26.43 |
| 2014/0250001 A1* | 9/2014 | Isaacson | G06Q 30/0235 |
| | | | 705/39 |
| 2014/0279655 A1* | 9/2014 | Ganesh | G06Q 10/0833 |
| | | | 705/333 |
| 2015/0025995 A1* | 1/2015 | Yuan | G06Q 30/0631 |
| | | | 705/26.7 |
| 2015/0032638 A1* | 1/2015 | Dintenfass | G06Q 30/012 |
| | | | 705/302 |
| 2015/0095248 A1 | 4/2015 | Wong et al. | |
| 2015/0112836 A1* | 4/2015 | Godsey | G06Q 30/0613 |
| | | | 705/26.41 |
| 2015/0379460 A1* | 12/2015 | Zamer | G06Q 30/0601 |
| | | | 705/26.1 |
| 2016/0104254 A1* | 4/2016 | Zurada | G06Q 30/0269 |
| | | | 705/319 |
| 2016/0125507 A1* | 5/2016 | Bueno Lobl | G06Q 30/0613 |
| | | | 705/26.41 |
| 2016/0180442 A1* | 6/2016 | Bar | G06Q 30/0631 |
| | | | 705/26.7 |
| 2016/0210602 A1* | 7/2016 | Siddique | G06Q 20/384 |
| 2016/0379213 A1* | 12/2016 | Isaacson | G06F 3/048 |
| | | | 705/44 |
| 2017/0004582 A1* | 1/2017 | Engstrom | G06Q 20/12 |
| 2017/0200209 A1* | 7/2017 | Cheng | G06Q 30/0601 |
| 2017/0236196 A1* | 8/2017 | Isaacson | G06Q 30/0641 |
| | | | 705/14.51 |
| 2017/0330232 A1* | 11/2017 | Kendall | G06Q 30/0643 |
| 2018/0150869 A1* | 5/2018 | Finnegan | G06Q 30/0239 |
| 2019/0007381 A1* | 1/2019 | Isaacson | G06Q 50/01 |
| 2019/0066175 A1* | 2/2019 | Godsey | G06Q 30/0613 |
| 2019/0114693 A1* | 4/2019 | Zhang | G06Q 30/0637 |
| 2019/0230070 A1* | 7/2019 | Isaacson | G07G 1/0036 |
| 2019/0340700 A1* | 11/2019 | Haas | G06Q 40/12 |
| 2020/0014671 A1* | 1/2020 | Isaacson | G06Q 20/20 |
| 2020/0065882 A1* | 2/2020 | Lobl | G06Q 30/0613 |

OTHER PUBLICATIONS

Kim, Hongki, Kil-Soo Suh, and Un-Kon Lee. "Effects of Collaborative Online Shopping on Shopping Experience through Social and Relational Perspectives." Information & management 50.4 (2013): 169-180. Web. (Year: 2013).*

Yue, Yanzhen, Xiaojuan Ma, and Zhenhui Jiang. "Share Your View: Impact of Co-Navigation Support and Status Composition in Collaborative Online Shopping." Proceedings of the SIGCHI Conference on Human Factors in Computing Systems. ACM, 2014. 3299-3308. Web. (Year: 2014).*

Xiao, Ying. "Recommending Best Products from E-Commerce Purchase History and User Click Behavior Data." ProQuest Dissertations Publishing, 2018. Print. (Year: 2018).*

Baharlou, Simin, "Patent Cooperation Treaty International Preliminary Report on Patentability dated Nov. 12, 2020", Patent Cooperation Treaty Application No. PCT/US2019/030270, Patent Cooperation Treaty, Nov. 12, 2020.

Copenheaver, Blaine R., "Patent Cooperation Treaty International Search Report and Written Opinion dated Jul. 10, 2019", Patent Cooperation Treaty Application No. PCT/US2019/030270, Patent Cooperation Treaty, Jul. 10, 2019.

* cited by examiner

SYSTEM FOR GENERATING SHAREABLE USER INTERFACES USING PURCHASE HISTORY DATA

PRIORITY

This application claims priority to U.S. Provisional Patent Application No. 62/665,871, filed May 2, 2018, entitled "System for Converting Purchase History Data". Application No. 62/665,871 is incorporated by reference herein in its entirety.

BACKGROUND

Purchase history information associated with individuals may be used for a wide variety of purposes, including predictive and advertisement purposes.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
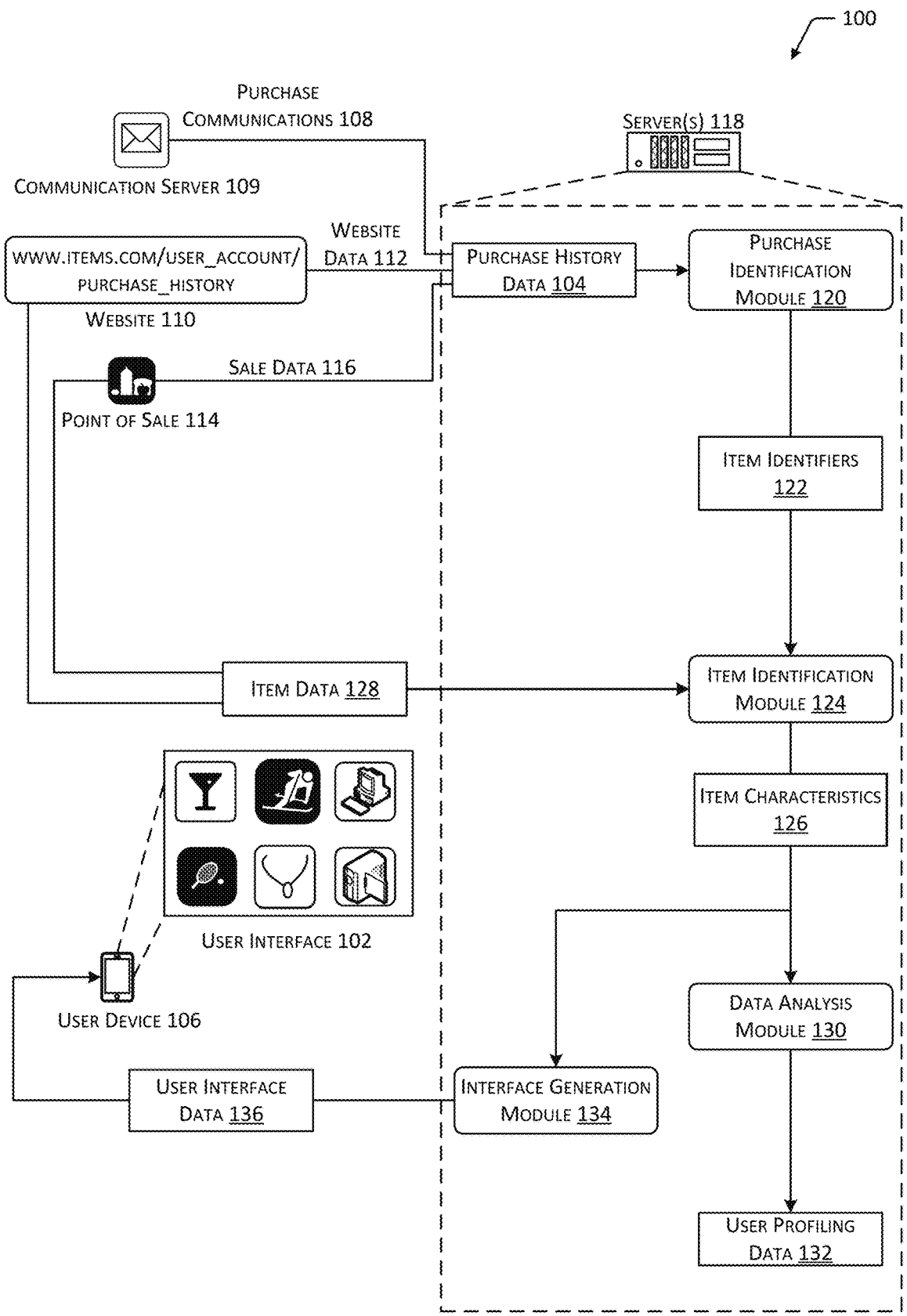
FIG. 1 depicts an implementation of a system for generating a user interface based on purchase history data associated with a user account.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

When individuals perform purchase transactions to acquire goods or services, a record of these purchases may be generated. For example, many websites, online merchants, and other entities maintain purchase histories associated with user accounts. Purchase histories may include a record of purchase transactions and other types of user interactions associated with items available for purchase. For example, a purchase history for a user account may include a record of each item for which a purchase transaction was completed for the user account and in some cases, the date or time at which the purchase transaction was completed, a purchase price, a shipping address, or other information associated with the purchase transaction. In some implementations, a purchase history for a user account may also include a record of items that were returned, user reviews and ratings for items that were purchased, and so forth. In some cases "brick and mortar" establishments and other types of point-of-sale merchants may also maintain purchase histories associated with various buyers, such as by associating identifying information obtained from a buyer's method of payment, membership, or from the buyer directly, with information regarding the purchase completed by the buyer. For example, merchants may utilize a point-of-sale payment system to receive and process a payment from a buyer, and the point-of-sale payment system may generate data indicative of the sale. In some cases, information regarding a point-of-sale transaction may be provided to buyers or sellers using an e-mail or other type of notification. Additionally, various sellers of goods and services may generate electronic receipts, such as confirmation e-mails, that may include information regarding purchases made by an individual, independent of whether the seller maintains purchase history data for users. For example, a user may be provided with an e-mail that includes information regarding a purchase transaction independent of whether a seller also maintains purchase history information regarding the user. As such, purchase history data for a particular individual may include many forms, many formats, and may span multiple platforms. The totality of a user's purchase history may be useful to predict future purchases of a user and determine purchasing patterns, such as the timing of a user's purchases, a user's preferred brands, a user's preferred products, and so forth. However, the conversion of purchase history data from a large number of sources into usable media may be hindered by the large number of formats and methods associated with the recording of purchase histories. For example, a user's purchase history data may include multiple confirmation e-mails associated with different e-mail accounts, each having a different format, multiple purchase histories associated with online user accounts, each purchase history being accessed in a different manner, as well as data associated with point-of-sale systems, each source of data having a different format.

This disclosure relates to systems that may be used to automatically locate and identify sources of purchase history data associated with a user, extract relevant information from the identified sources, and enable a user to create a viewable and shareable user interface using at least a portion of the purchase history data. In some implementations, the user interface may be used by the associated user, such as to view the user's own purchase history, sort items into collections, and so forth, or by another user with whom the user interface is shared. A user with whom the user interface is shared may view items purchased by another user and in some implementations may access items for purchase, such as by including a link to a webpage associated with an item in the user interface. To generate the user interface, purchase history data associated with a first user account may be determined by accessing one or more e-mails, one or more accounts with merchant websites, one or more point-of-sale systems, and so forth. Use of confirmation e-mails, website purchase history data, and so forth may enable a user interface to be generated that includes only information for items actually purchased by a user. For example, the particular data obtained using purchase history data, such as images of items provided by sellers, may be used as proof of an actual purchase of an item by a user. In some implementations, a purchase transaction may be further verified by comparing information regarding the purchase from the purchase history data with information regarding the purchased item obtained from a seller. For example, if an item image, name, price, or other identifier indicated in a confirmation e-mail for a purchase transaction matches the information for the item presented on a seller website, this may indicate that the item was actually purchased by the user. Using the purchase history data, identifiers indicative of items that were purchased by a user, such as item names, stock keeping units (SKU), or other types of item identifiers, may be determined. Purchase history data may also indicate purchases of services rather than goods, and lease or rental of items rather than direct purchases of the items. As used herein, the terms "purchase" or "purchase transaction" may relate to either goods, services, or both goods and services, and may also include leasing or rental of goods or services, initiating a subscription for a good or service, and so forth. Additionally, a purchase or purchase transaction may include use of previously purchased gift cards, coupons, or other types of discounts or offers in addition to, or in place of, using currency or other payment methods. Furthermore, in some implementations, a purchase transaction may include an exchange of an item for another item, or a return of a previously purchased item.

Item data associated with various goods or services available for purchase may be received from one or more merchant systems associated with sellers, such as merchant websites through which items are available for purchase. For example, item data may associate an item identifier for an item with corresponding item characteristics, such as an item name, an indication of the seller of the item, one or more images depicting the item, a price of the item, descriptive information about the item, and so forth. As used herein, "item characteristics" may include categories, fields, tags, nodes, or other types of elements, as well as the particular data or content associated with such elements. Correspondence between the item data and the identifier of an item determined from an e-mail or other source of purchase history data may be used to determine the particular characteristics associated with an item that was purchased. For example, if one or more item identifiers determined from purchase history data for a user account matches one or more item identifiers of the item data, this correspondence may indicate the particular items that were purchased by a user. As described previously, correspondence between item information determined from purchase history data and item information determined from the item data may be used to verify that an item was purchased by a user. For example, if a confirmation e-mail or other type of purchase history data includes a particular item name, price, image, or other information regarding the item and the item data includes information that matches the information determined from the purchase history data, this matching information may confirm that the item was purchased by the user associated with the purchase history data. Additionally, based on this correspondence, the item characteristics that are associated with the matched item identifier(s) may be determined and used in one or more user interfaces. As one example of purchase history data, a confirmation e-mail received from a computing device associated with a seller may include information indicative of an item that was purchased. This information may be used to identify the item. Correspondence between the identifying information and item data may be used to determine other characteristics about the item. For example, once an item identifier is determined from an e-mail or other source of purchase history data, the item data may be searched to determine whether a matching item identifier exists. The item characteristics associated with the matched item identifier may represent the characteristics of the item that was purchased. In such a case, even if a purchase confirmation e-mail includes only an item name or other item identifier and does not include other information regarding the item, characteristics of the item that match the item name or identifier may be determined using the item data. In some cases, the determined item characteristics received from a merchant website or other source of item data may be used to verify that a user purchased an item. For example, a user interface presenting an image of a purchased item for which an identifier was determined from a confirmation e-mail may indicate that the pictured item was purchased by the user.

User interface data for generating a user interface including at least a subset of the items and their corresponding characteristics may be determined based on the determined item identifiers and item characteristics. The user interface data may be used to generate a user interface that presents the item(s) and characteristic(s) to a user. For example, a user interface may include a list structure, a grid structure, or other types of layouts or formats. Continuing the example, a list may present multiple items purchased by a user, and each named item may be shown in association with characteristics of the item, such as the item seller, item category, price, and so forth. In other implementations, a user interface may include an audible or haptic user interface rather than a visible user interface. For example, a user interface may include audio output from one or more speakers, indicative of item identifiers and item characteristics. In some implementations, the item data may indicate a current purchase price of the item, while the item characteristics may also include the date and time that the user purchased the item and a price that the user paid for the item at the time of the purchase. For example a current purchase price for an item that is available for purchase today may differ from the purchase price paid by a user at the date and time of purchase. In some implementations, the user interface may include images of multiple items, arranged in a grid structure or another type of layout. To provide the user interface with a uniform aesthetic and functional appearance, the images may be modified prior to generation of the user interface. For example, the item data may include an image of an item. Computer vision or similar techniques may be used to determine the locations of the edges of the item within the image, such that a first portion of the image depicting the item and a second portion depicting a background are identified. To facilitate identification of the portion of the image containing the item, if more than one image or more than one version of an image is included in the item characteristics, the image having the greatest size or greatest resolution may be used. The second portion may be removed from the image and replaced with an alternate background that includes a color that corresponds to the first portion of the image. For example, one or more colors included in the first portion may be determined, then a corresponding color may be identified and placed in the background of the modified image. In some cases, colors may correspond to types or categories of items, dates the user purchased the items, prices of the items, or other item characteristics, to enable characteristics of the items to be visually differentiated based on the background of the images. In other implementations, images depicting items determined from item data may be included in a user interface as an indication that a particular item was purchased, without manipulating the images.

User interfaces generated using the systems described herein may be used as a form of shareable media. For example, a first user may access a user interface that presents the totality of a user's purchase history across multiple platforms for personal use. The first user may then select all or a portion of the presented items to be included in a shareable user interface that the first user may make accessible to one or more other users. Continuing the example, the first user may choose to indicate a first collection of items as publicly accessible (e.g., accessible to any other user), a second collection of items as private (e.g., accessible only to the first user), a third collection of items as accessible to a particular group of other users, such as co-workers of the first user, and a fourth collection of items accessible to a different group of other users, such as friends and family members of the first user. The first user may select particular users, accounts, or profiles for inclusion in or exclusion from various groups or access to user interfaces. A second user may then access selected portions of a user interface to which the second user has been granted access by the first user, such as by accessing a profile associated with the first user, a landing page associated with a user account of the second user, search results associated with a query provided by the second user, and so forth. For example, a landing page associated with the second user may present links or user interfaces associated with other users that have granted access to the user account associated with the second user or that the second user has selected to follow.

In some implementations, purchase history information associated with a first user may be prioritized when other users are searching for items to purchase. For example, a first user may select to make a particular collection of items that includes a pair of running shoes accessible to a second user. When the second user initiates a search query to determine running shoes available for purchase, the pair of running shoes purchased by the first user may be presented to the second user prior to presenting other items, such as earlier in a list, table, grid, or other form of search output relative to other items. In other implementations, the pair of running shoes purchased by the first user may be differentiated from other items using visible characteristics, such as a particular location, font size, or color, for the item purchased by the first user that is not used to present other items. The information presented to the second user may include an indication that the first user purchased the item. In some implementations, if the first user returns the item, this item may be removed from the data presented to the second user due to the return of the item indicating disinterest by the first user. In other implementations, if the first user returns the item, an indication of the return may be presented to the second user to indicate dislike of the item by the first user. In some cases, the user interface may be used to initiate a purchase transaction for an item or to navigate to a webpage where an item may be purchased. For example, the user interfaces presented to the first user or the second user may include a link to a webpage associated with one or more of the presented items. Continuing the example, selection of an indication of a particular item presented in a user interface may navigate to a webpage associated with the seller of the particular item. In other implementations, selection of the indication of the particular item may cause a purchase transaction for the item to be initiated. For example, selection of the indication of the item may cause the automatic addition of the item to an electronic shopping cart and navigation to a webpage to complete the purchase of the item, such as by providing payment or shipping information.

In some implementations, purchase history data for multiple users may be compared to determine users that have similar preferences regarding types of items, brands of items, or timing of purchases. For example, purchase history data for two users may indicate that the two users purchased many of the same items, the same brands of items, the same types or categories of items, and so forth. Information determined from users having similar purchase histories may be prioritized when other users are searching for items to purchase in a similar manner. In other implementations, purchase history data from multiple users may be compared to determine particular users whose purchases may influence the purchase of other users. For example, if a first user frequently purchases items shortly after a second user has purchased the same items, information regarding the second user's purchases may be prioritized when presenting information to the first user. In some implementations, if a second user purchases an item after viewing the item within a first user's purchase history, the first user may be provided with a notification indicating that the first user's shared collection of items influenced the second user to purchase the item. In some cases, an identity of the second user may be provided to the first user in the notification, such as if the first user and the second user have manually selected to create a relationship between respective user profiles. In other cases, an indication of an influenced purchase may be provided to the first user without identifying the second user, such as by indicating that 53 other users have been influenced by the first user and purchased an item. In still other cases, an indirect or relative identification of a user may be provided, such as an indication that a friend of a particular other user having a relationship with the first user has purchased an item using the first user's shared user interface. Conversion of a user's purchase history into a shareable media may add a social aspect to the act of purchasing items by enabling a user to cultivate a profile of shared collections of purchased items and to track the influences of the user on the purchases of other users. Additionally, users that incentivize purchases by other users may be tracked and rewarded to incentivize the users to generate collections of purchased items that are accessible to other users. For example, a user may be provided with financial remuneration, items, discounts on purchases, or other incentives based on a quantity or value of purchases influenced by the user.

Generation of user interface data using the implementations described herein may enable users to access and view data indicative of previous purchases, in some cases across multiple platforms and formats, as a single output that is presented in a manner that facilitates access to current information about each item based on item data received from merchants. For example, generation of a user interface may link images determined from a merchant website or other source of item data with a user's purchase history. Use of a simplified user interface may enable information to be located more easily and efficiently by users, conserve use of computing resources, and so forth. For example, a simplified user interface may be generated and presented using less bandwidth than other alternatives. Additionally, a simplified user interface, such as a grid or other arrangement of images representative of purchased items, may be more easily presented on devices having small display areas, such as smartphones and other mobile devices, enabling users of mobile devices and other types of portable computing devices to more easily access and interact with representations of purchased items for various users.

Furthermore, enabling sharing of all or a portion of data represented in a user interface with other users may provide multiple users with relevant information regarding prospective purchases, such as indications of specific items purchased by particular friends, demographically similar users, or other related users. By prioritizing the presentation of relevant data to users prior to presenting other, potentially less relevant data, computing resources may be conserved. For example, a user may locate relevant data regarding a type of item to be purchased using fewer search queries. Additionally, by increasing the probability that a user will be presented with data indicative of items that the user will find satisfactory, the number of returned items may be decreased, conserving shipping and administrative expenses. Further, enabling a user to navigate directly to a webpage or other interface for purchasing an item using a link in a shareable user interface may reduce the number of search queries, selections, and other navigational steps needed to locate and purchase items.

FIG. 1 depicts an implementation of a system 100 for generating a user interface 102 based on purchase history data 104 associated with a user account. For example, one or more user devices 106 associated with a user account may be used to perform one or more purchase transactions. While FIG. 1 depicts a single user device 106, a user may use any number of user devices 106 to perform any number of purchase transactions. Additionally, while FIG. 1 depicts the user device 106 as a portable computing device, such as a smartphone, the user device 106 may include any type of computing device, including without limitation a personal computer, a portable computing device, a wearable computing device, an automotive computing device, an audio device, a video device, and so forth.

In some cases, a purchase transaction associated with a user account may be confirmed by providing a purchase communication 108 to the user device 106 or to a communication server 109, such as an e-mail server, accessible to the user device 106. For example, a user device 106 may be used to complete a purchase transaction associated with an e-commerce website 110. A computing device associated with the website 110 may then provide a purchase communication 108 to the user device 106 or to the communication server 109. In other cases, a website 110 may retain website data 112 indicative of one or more purchase transactions. For example, a user of the user device 106 may also be associated with a user account of the website 110. By accessing the user account associated with the website 110, the website data 112 may be accessed. Continuing the example, a user may access and view a purchase history associated with the user account on the website 110. In some implementations, a user may complete a purchase at a point of sale 114. A point of sale 114 may maintain sale data 116 indicative of one or more purchase transactions performed by a user. For example, point-of-sale payment systems may generate sale data 116 that includes information regarding a purchase transaction. In some cases, the website data 112 or sale data 116 may also include shipping data which may be used to verify not only that an item was purchased, but that the item was shipped to and received by a user.

Collectively, one or more of the purchase communications 108, website data 112, and sale data 116 may constitute purchase history data 104 associated with a user account that may be used to generate one or more user interfaces 102 that present at least a portion of the purchase history data 104. One or more servers 118 or other types of computing devices may determine the purchase history data 104, which may be associated with purchase transactions across multiple platforms, such as communications sent to a user device 106 subsequent to a purchase, purchases transacted using a website 110, or purchases completed at a point of sale 114. In some implementations, the server(s) 118 may generate the user interface 102 based on the purchase history data 104 and provide the user interface 102 to a user device 106 for presentation. In other implementations, the server(s) 118 may determine data useable to generate the user interface 102, but the user interface 102 may be generated by the user device 106 or another computing device in communication with the user device 106.

A purchase identification module 120 associated with the server(s) 118 may receive purchase history data 104 from one or more user devices 106, communication servers 109, websites 110, or points of sale 114. For example, the purchase identification module 120 may be used to identify purchase communications 108 associated with a user device 106 or communication server 109 and differentiate the purchase communications 108 from other communications. A user may provide access information to enable the purchase identification module 120 to access communications associated with an account on the communication server 109. In other implementations, a user may authorize an application programming interface (API) or other type of service or process to access and receive communications from the communication server 109. Continuing the example, purchase communications 108 may be associated with an e-mail account or other type of electronic communications, and the purchase identification module 120 may be configured to determine characteristics of the e-mail, such as a sender or domain associated with the e-mail, content of the e-mail, and so forth. In some implementations, the purchase identification module 120 may determine correspondence between the sender, domain, header, or other data or metadata associated with a communication and seller data that is indicative of purchase communications 108, such as e-mail addresses known to be associated with sellers of items or a third party that sends e-mail on behalf of sellers. In other implementations, the purchase identification module 120 may identify content with a communication that is indicative of a purchase, such as a price or other alphanumeric strings indicative of a purchase transaction. In still other implementations, the purchase identification module 120 may include one or more machine learning algorithms configured to identify information indicative of purchase transactions within an electronic communication independent of the location or format of the communication.

In some implementations, the purchase identification module 120 may be configured to convert a purchase communication 108 to a list of relevant information or another type of data structure. For example, a purchase communication 108 may include both information that is relevant to a purchase transaction, and one or more design elements or other tags or attributes not related to a purchase transaction, empty elements such as root elements with empty nested nodes, and so forth. Continuing the example, a purchase communication 108 may be converted from its original format to a list or other data structure containing relevant information by removing line breaks, spaces, and other such portions that do not contain text, images, or other types of data. Additionally, data relating to attributes such as style, script tags, comments, or other types of tags may be removed since such data does not typically relate to the content or purpose of the purchase communication 108, itself. In some cases, tag data may be used to identify relevant attributes of a communication. For example, data associated with a tag that is labeled as a SKU may be retained, while tags and associated data determined to relate to style elements may be removed. In some cases, a purchase communication 108 may include elements that do not contain content, such as empty nodes or tables, which may also be removed. Removal of these elements from the purchase communication 108 may modify the purchase communication 108 such that only information that is potentially relevant to a purchase transaction is retained. As such, the retained information may be converted to a list or other type of generally unformatted structure to facilitate the determination of information relevant to the purchase transaction by the purchase identification module 120. For example, a modified purchase communication 108 may be reduced to a list that includes a domain name, a sender e-mail address, alphanumeric data indicative of a particular item, item type, or item brand that was purchased, a price, a date and time of the purchase, and so forth. The list of information may be readily processed by the purchase identification module 120, such as by identifying alphanumeric strings indicative of a purchase transaction, while reducing the likelihood that irrelevant information, such as design elements, will hinder determination of relevant information or result in an unrelated communication being incorrectly classified as a purchase communication 108.

As another example, the purchase identification module 120 may be configured to access a user account associated with a website 110 and retrieve at least a portion of the website data 112 associated with the user account. Continuing the example, a user may provide login information or other credentials that may be used to access a website account of the website 110. The purchase identification module 120 may be configured to access the website 110 and navigate to a portion of the website 110 where website data 112 indicative of purchase transactions is accessible. In some cases, the purchase identification module 120 may determine correspondence between a particular website 110 and known data indicative of the manner in which website data 112 may be accessed from the website 110. In other cases, the purchase identification module 120 may include one or more machine learning algorithms configured to determine the location of data indicative of purchase transactions within the website 110. In still other cases, a computing device associated with the website 110 may provide website data 112 indicative of purchase transactions to the server(s) 118. In a similar manner, the purchase identification module 120 may be configured to access a computing device associated with a point of sale 114 to locate and retrieve sale data 116 from the point of sale 114. In other cases, the point of sale 114 may provide the sale data 116 to the server(s) 118.

The purchase identification module 120 may be configured to determine one or more item identifiers 122 from the purchase history data 104. Item identifiers 122 may include item names, numbers, or other data that may be used to differentiate particular items that were purchased from other items. For example, the purchase identification module 120 may be configured to locate particular types of alphanumeric strings within the purchase history data 104, such as a stock keeping unit (SKU), an item name, a brand name, and so forth. Based on the item identifiers 122, an item identification module 124 associated with the server(s) 118 may determine the item characteristics 126 of the items that were purchased. For example, a purchase communication 108, website data 112, or sale data 116 may not include each item characteristic 126 of interest, or one or more item characteristics 126, such as the current price of an item, may have changed. However, the purchase history data 104 may still include sufficient information to identify an item that was purchased, from which an item identifier 122 may be determined. The item identification module 124 may determine correspondence between the item identifiers 122 determined by the purchase identification module 120 and item data 128. Item data 128 may associate item identifiers 122 for an item with corresponding item characteristics 126. For example, item data 128 may be received from mercantile websites 110, points of sale 114, or other sources of items available for purchase. Continuing the example, in response to determining an item identifier 122 the item identification module 124 may access an image of the associated item, or other item characteristics 126, from a merchant website 110. In some implementations, the websites 110, points of sale 114, or other sources may provide the item data 128 to the server(s) 118 for use. In other implementations, the item identification module 124 or another module associated with the server(s) 118 may be configured to access the websites 110, points of sale 114, or other sources to access and retrieve the item data 128, such as in response to determining an item identifier 122. The correspondence between the item identifiers 122 and the item data 128 may be used to determine the item characteristics 126 that correspond to the item identifiers 122 determined by the purchase identification module 120. Item characteristics 126 may include a type or category associated with an item, a brand or manufacturer, a purchase price, a date and time at which the item was purchased, a color, a size, one or more material characteristics, an image depicting the item, text descriptive of the item, and so forth. For example, an item identifier 122 such as a SKU or an item name may be determined from purchase history data 104, such as a purchase confirmation e-mail received from a merchant website 110. The determined item identifier 122 may correspond to an item identifier 122 for an item included in the item data 128. The item data 128 may associate the SKU, item name, or other type of identifier 122 with item characteristics 126 for the item, such as a price, brand, manufacturer, material characteristics, image of the item, and so forth. In some cases, the purchase history data 104 may also include one or more item characteristics 126, such as a purchase price that differs from the current price indicated in the item data 128, a date of purchase, and so forth. As described previously, in some implementations, correspondence between the purchase history data 104 and item data 128 may be used to verify that a user completed a purchase transaction associated with an item. For example, if information regarding a purchase transaction determined from a purchase communication 108 or other type of purchase history data 104 matches item data 128 associated with the item, this correspondence between the purchase history data 104 and item data 128 may serve as a verification that the item was purchased by the user associated with the purchase history data 104.

In some implementations, based on the item identifiers 122 and item characteristics 126, a data analysis module 130 associated with the server(s) 118 may determine user profiling data 132 associated with the user account for which the purchase history data 104 was determined. User profiling data 132 may indicate patterns and preferences indicative of the purchasing habits of a user. For example, user profiling data 132 may indicate the types of products typically purchased by a particular user and the times at which such products are usually purchased. Continuing the example, the user profiling data 132 may indicate that a user wears medium-sized T-shirts, prefers blue articles of clothing, purchases grocery items on Friday evenings, purchases electronic items during the month of December, and is more likely to purchase items accompanied by an image that includes the color blue. User profiling data 132 may be used to provide advertisements, recommendations, discounts, and other types of offers to users based on the determined purchasing habits of the user. User profiling data 132 may also be used to group multiple users into demographic groups that exhibit similar purchasing habits. For example, a purchase transaction may include an associated item, item category, item brand, or other characteristics of the item, as well as a purchase price, a purchase date, a purchase time, and so forth. The data analysis module 130 may compare the characteristics of purchase transactions for a first user with those of a second user to determine similarities between the purchase transactions. For example, two users having similar purchasing habits may both purchase a particular type of cellular telephone independent of the date of purchase, may both purchase grocery items on Friday evenings independent of the particular items purchased, and may both purchase electronic items as gifts during the month of December. If two users share at least a threshold quantity or threshold percentage of purchase characteristics, the two users may be determined to be similar. Based on the commonalities between the purchasing habits of a group of users, particular items or other information may be prioritized when presenting data to a user. For example, data indicating purchases made by similar users may be presented prior to data associated with other items. As another example, users that share similar purchase histories, such as users that have purchased a count or percentage of the same items, same brands of items, or same types or categories of items may be grouped as a set of related users. When presenting data to a particular user, data associated with related users may be presented prior to other data.

An interface generation module 134 associated with the server(s) 118 may use the item identifiers 122 and item characteristics 126 to determine user interface data 136. The user interface data 136 may include data indicative of one or more item identifiers 122 or item characteristics 126, which may be included in a user interface 102 for presentation on the user device 106. In some implementations, the interface generation module 134 may generate the user interface 102 using the user interface data 136, and the user interface 102 may then be provided to the user device 106 for presentation. In other implementations, the user device 106, or another computing device in communication with the user device 106, may receive the user interface data 136 and generate the user interface 102 based on the user interface data 136. The user interface 102 may include a list structure, a grid structure, or other types of layouts or formats that associate particular items with their corresponding item characteristics 126. For example, FIG. 1 depicts the user interface 102 including a grid structure presenting images of items that were purchased in an aesthetic and functional manner. In some implementations, colored backgrounds or other features of the presented images may indicate characteristics of the purchased items. In some implementations, the format or arrangement of the user interface 102 may be determined at least in part based on one more characteristics of the user device 106, such as a device type or a size of a display associated with the user device 106. For example, a user device 106 having a small display area may generate a user interface 102 that includes a grid structure presenting images of items determined from merchant websites 110 or other sources of item data 128, while a user device 106 having a larger display area may include a list structure or additional information regarding one or more of the items. In some implementations, one or more of the images or other indications of items in the user interface 102 may function as links to initiate a purchase transaction for an item, navigate to a webpage associated with the item or with a seller of the item, and so forth. FIG. 1 depicts the user device 106 that is associated with the purchase history data 104 presenting the user interface 102. For example, a user associated with the user device 106 may access the user device 106 to view a user interface 102 presenting information regarding at least a portion of the user's own previous purchase transactions. In some implementations, the user interface 102 may include information associated with all or a default portion of the purchase transactions. In other implementations, user input selecting particular items or purchase transactions may be received, and the user interface 102 may present information regarding the selected items or purchase transactions. In some implementations, particular user interfaces 102 may be made accessible to other user accounts. For example, a user of the user device 106 may access user interfaces 102 associated with other user accounts if the user interfaces 102 are shared or otherwise made accessible to the user device 106, and user interfaces 102 that present information regarding the purchases of a user associated with the user device 106 may be made accessible to other users.

Figure 2:
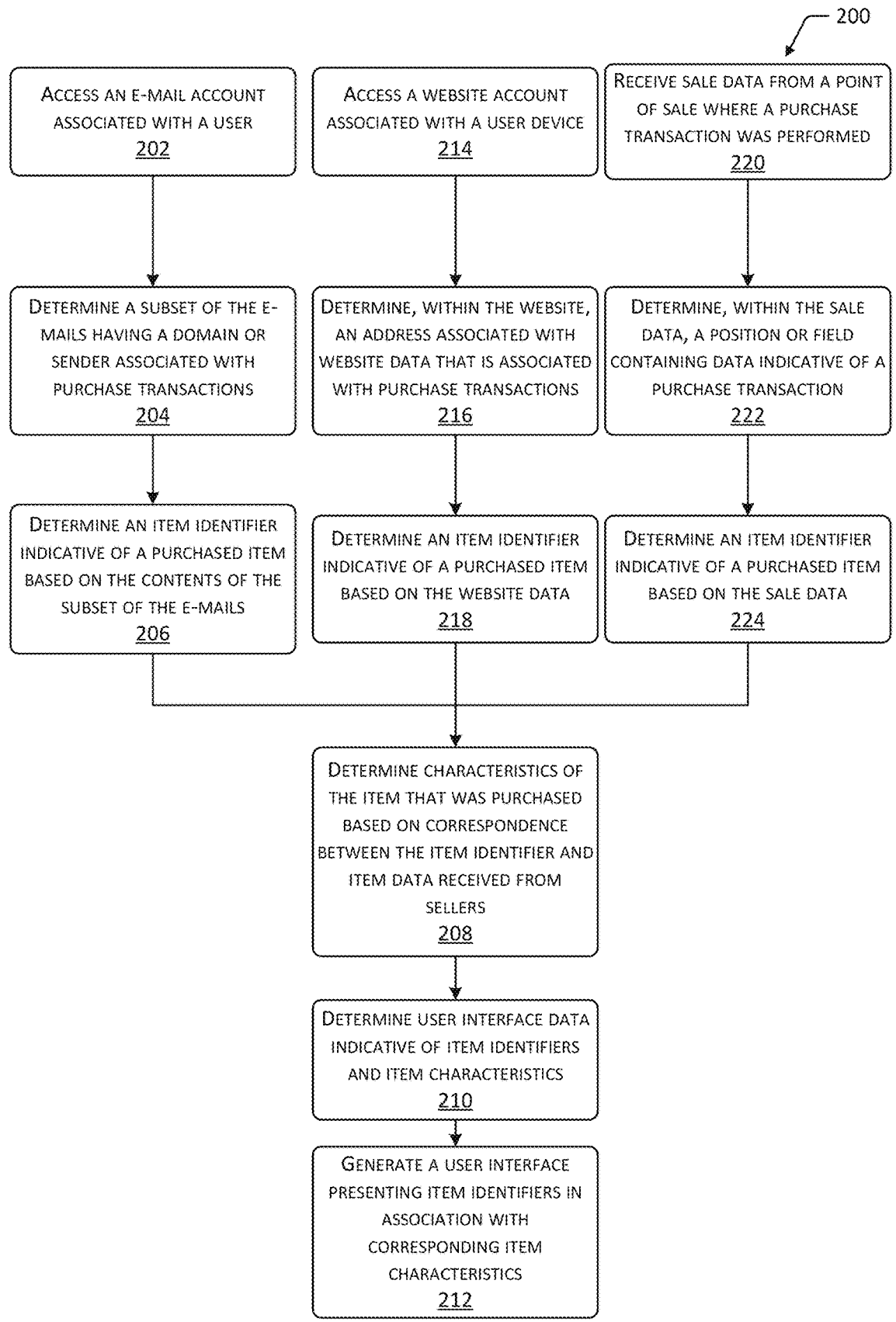
FIG. 2 is a flow diagram depicting example methods for determining item identifiers from purchase history data and using the item identifiers to determine user interface data.

FIG. 2 is a flow diagram 200 depicting example methods for determining item identifiers 122 from purchase history data 104 using the item identifiers 122 to determine user interface data 136. At 202, an e-mail account associated with a user may be accessed. For example, a user may provide information useable to access an e-mail account, such as a user name or e-mail address and a password, and this information may be used to obtain access to electronic communications received using the e-mail account. In other implementations, other types of electronic communication accounts, such as accounts associated with social networks, messenger applications, short message services (SMS), and so forth, may be accessed in a manner similar to an e-mail account.

At 204, a subset of the e-mails having a domain or sender associated with purchase transactions may be determined. For example, certain e-mail addresses may be used by sellers or other associated parties to provide confirmations of purchase transactions and data regarding the items that were purchased. A determination that an e-mail was received from such an e-mail address may indicate that the e-mail is associated with a purchase transaction. In other implementations, other data associated with the e-mail, such as a header, metadata, or contents of the e-mail may be used to determine that the e-mail is associated with a purchase transaction. For example, an e-mail that includes an alphanumeric string describing an item price may be associated with a purchase transaction. In some implementations, prior to determining the domain, sender, or other characteristics of the subset of e-mails that may indicate purchase transactions, the e-mails may first be processed to remove extraneous or irrelevant data. For example, attributes and elements relating to the design or formatting of the e-mail, tags and elements unrelated to purchase transactions, root elements with empty nested elements, and so forth may be removed from an e-mail. The remaining elements of the e-mail may be retained as an unformatted list to facilitate analysis of the e-mail to determine content indicative of a purchase transaction.

In some implementations, a machine learning algorithm may be used to identify e-mails associated with purchase transactions. For example, over time, a machine learning algorithm may identify text or other characteristics indicative of e-mails associated with purchase transactions, and each e-mail successfully or unsuccessfully identified may be used to further refine the machine learning algorithm. In one example implementation, an instance-based learning algorithm may be used to analyze e-mails. In an instance-based learning algorithm, each new instance of an e-mail, or another type of communication or data associated with a purchase transaction, may be compared with previous instances of such communications. For example, multiple previously-received communications may include target items of data, such as an item name, image, description, and price, positioned in the same location relative to other data. Use of an algorithm that determines the location of target items of data relative to other data, rather than based on a particular location within a document, may account for different templates that present similar information together, but in different locations in a document. Continuing the example, a particular value of relevance to a purchase transaction may historically be positioned adjacent to the same or similar sets of other values. As such, a value that is positioned proximate to a similar set of other values in a subsequent communication may be of relevance to a purchase transaction. An instance-based learning algorithm may identify a particular value of relevance to a purchase transaction using a similarity or distance measure to determine that the other values proximate to the particular value are similar to the values that have previously been proximate to other relevant values. For example, a Document Object Model (DOM) for a communication that includes a relevant value may be analyzed to determine the Hypertext Markup Language (HTML) tags occurring before and after the tag that contains the relevant value. The HTML tags may be used to identify particular values within a document independent of the location of the data associated with the tags or the content of the data. The tags that precede and follow the relevant value in historic communications may be tokenized and compared to subsequent communications to identify the presence of a similar set of tags within the subsequent communications. A sequence of tags occurring before a value and a sequence of tags occurring after the value may be used to identify the value as a value that is relevant to a purchase transaction. For example, if at least a threshold quantity or threshold percentage of tags that occur before or after a particular value are common between a current e-mail and a historic e-mail that contains a relevant value, or between a current e-mail and an average model based on historical e-mails, the particular value may be determined to be relevant to purchase transactions. E-mails or other documents that lack HTML tags common to purchase e-mails may be determined to be non-relevant with regard to purchase transactions.

At 206, an item identifier 122 indicative of an item that was purchased may be determined based on the contents of the subset of e-mails determined at 204. For example, after determining that an e-mail was received from a sender or domain associated with purchase transactions, the contents of the e-mail may be analyzed to determine alphanumeric strings or other types of data indicative of one or more items associated with the purchase transaction. Continuing the example, an e-mail associated with a purchase transaction may include an item name, SKU, an image depicting the item, text describing the item, or another unique identifier that may be used to differentiate the item from other items. An item identifier 122 may include one or more of alphanumeric data, audio data, video data, or other types of data. In some implementations, multiple item identifiers 122 indicative of the same item or different items may be determined from an e-mail. For example, both an item name and a SKU number may be determined for a purchased item. As another example, item names for six purchased items may be determined from an e-mail. In some implementations, a machine learning algorithm may be configured to locate and extract item identifiers 122 from an e-mail. For example, a machine learning algorithm may identify text that is normally indicative of the presence of an item identifier 122 and extract the text from the e-mail. If the text successfully identifies an item or does not successfully identify an item, this outcome may be used to modify the machine learning algorithm. For example, if an e-mail does not contain an item identifier 122, the e-mail may have been misidentified as being associated with a purchase transaction, or the machine learning algorithm may have been improperly configured to locate item identifiers 122.

At 208, characteristics of an item that was purchased may be determined based on correspondence between the item identifier 122 determined at 206 and item data 128 received from merchant systems associated with sellers. For example, merchant systems may provide item data 128, item data 128 may be periodically retrieved from computing devices associated with sellers, or item data 128 associated with a seller device may be accessed. The item data 128 may associate item characteristics 126 with corresponding item identifiers 122. For example, item data 128 may associate one or more of an image, descriptive text, a price, a size, a color, or a material characteristic of an item with one or more of an item name, SKU, or other identifier indicative of the item. In some implementations, correspondence between information regarding an item determined from an e-mail and information regarding the item determined from the item data 128 may be used to verify that the item was purchased.

At 210, user interface data 136 may be determined that associates one or more item identifiers 122 with corresponding item characteristics 126. As described with regard to FIG. 1, a user interface 102 based on the user interface data 136 may be generated by a computing device other than the device used to determine the item characteristics 126. For example, at 212, data useable to generate the user interface 102 may be provided to a user device 106 or another computing device in communication with the user device 106, which may in turn generate a user interface 102 presenting item identifiers 122 in association with corresponding item characteristics 126. In some implementations, the user interface 102 may include a list structure, a grid structure, or another type of format. The user interface 102 may associate information that identifies an item, such as an item name or an image depicting an item, with other characteristics of the item. The user interface 102 may also link images of items determined from a merchant website 110 or other source of item data 128 with purchase history data 104 for a user account. For example, images of items purchased by a user may be retrieved and included in a user interface 102 to indicate a user's purchase of the items. As discussed with regard to FIG. 1, visible characteristics of the user interface 102 may indicate characteristics of the item, such as colors associated with image backgrounds or text presented in association with item identifiers 122. In some implementations, the user interface 102 may include item characteristics 126 determined from the associated e-mail in addition to the item characteristics 126 determined based on item data 128. For example, an e-mail confirming a purchase transaction may indicate a date at which the purchase transaction occurred, a purchase price, an image or text descriptive of the item, a size or color of the item, and so forth. In some implementations, the user interface 102 may include links or other features for navigating to a webpage associated with an item or a seller of an item, or to initiate a purchase transaction for an item. For example, selection of an image depicting an item via user input may be used to navigate to a merchant website 110 offering the selected item for purchase. As described with regard to FIG. 1, in some implementations, a user interface 102 that presents information regarding all or a default portion of the purchase transactions for a user account may be presented, such as for personal use by a user to review the user's own purchase history or to generate other user interfaces 102 to be shared with other users. In other implementations, user input may be received to select particular items or purchase transactions for inclusion in a user interface 102.

At 214, a website account associated with a user device 106 may be accessed. For example, a user may provide information useable to access a website account, such as an account name and password, and at 214, a browser or similar application may be used to navigate to the corresponding website 110 to provide the information used to access the website account. In other implementations, networks or platforms other than websites 110 may be accessed in a similar manner.

At 216, an address, within the website 110, of website data 112 that is associated with purchase transactions may be determined. For example, data received from or retrieved from a seller website 110 may be used to determine a link, network address, or other type of location with the website 110 where a purchase history associated with a user account is accessible. In other implementations, a machine learning algorithm may be used to determine a location of data associated with purchase histories within the website 110. For example, an instance-based learning algorithm may be used to determine the location of other data that is typically proximate to data associated with purchase histories. In response to determining the presence of at least a threshold quantity of data that is expected to be proximate to data associated with a purchase history, the data associated with the purchase history may be extracted for use.

At 218, an item identifier 122 indicative of an item that was purchased may be determined based on the website data 112. For example, website data 112 associated with a purchase history may include item names, SKUs, or other item identifiers 122, as well as one or more item characteristics 126, such as an image depicting an item or a date or price at which the item was purchased.

Subsequent to determining the item identifier 122 at 218, characteristics of the item that was purchased may be determined at 208, and user interface data 136 may be determined at 210. A user interface 102 may be generated based on the user interface data 136 at 212. As discussed previously, in some implementations, the user interface 102 may include item characteristics 126 determined based on the website data 112 in addition to item characteristics 126 determined based on item data 128. For example, website data 112 may indicate a purchase price, a date of purchase, descriptive text, or physical characteristics of the item. As discussed previously, the user interface 102 may also include links for initiating purchase transactions for one or more items or for navigating to webpages or other types of interfaces associated with the item(s) or sellers of the item(s).

At 220, sale data 116 may be received from a point of sale 114. For example, a point-of-sale payment system may be used to generate electronic receipts, confirmation e-mails, or types of records for a purchase transaction that may constitute sale data 116. In some implementations, a computing device associated with a point of sale 114 may provide the sale data 116 to one or more servers 118. In other implementations, the server(s) 118 may retrieve the sale data 116 by accessing such a computing device.

At 222, a position or field, within the sale data 116, that contains data indicative of a purchase transaction may be determined. For example, sale data 116 may include various information regarding a buyer or seller that is unrelated to a purchase transaction, as well as information that describes the purchase transaction, such as a date, price, item identifiers 122, and so forth.

At 224, an item identifier 122 indicative of a purchased item may be determined based on the sale data 116. For example, sale data 116 may include an item name, SKU number, one or more images depicting the item or text describing the item, or other data that may be used to differentiate the item from other items. In some implementations, one or more machine learning algorithms may be used to locate and extract item identifiers 122 from sale data 116. For example, an instance-based learning algorithm may be used to determine the location of other data that is typically proximate to item identifiers 122. In response to determining the presence of at least a threshold quantity of data that is expected to be proximate to item identifiers 122, the data corresponding to the item identifier(s) 122 may be identified for use.

Subsequent to determining the item identifier 122, characteristics of the purchase may be determined at 208, and user interface data 136 indicative of item identifiers 122 and item characteristics 126 determined based on one or more of the item data 128 or the sale data 116 may be determined at 210. For example, the user interface data 136 may include HTML data, such as HTML executable code, scripts, and so forth, which may be used by an application executing on a user device 106, or another computing device in communication therewith, to generate a visible user interface 102 based on the HTML code, scripts, or other user interface data 136. A user interface 102 may be generated based on the user interface data 136 at 212. While FIG. 2 depicts three example sources of purchase history data 104 that may be used to determine the user interface data 136, any number of sources of purchase history data 104 and any combination of such sources may be used to determine the user interface data 136. For example, user interface data 136 may be determined using only a single source of purchase history data 104, such as purchase communications 108 associated with an e-mail account, or the user interface data 136 may be determined using a combination of purchase communications 108, website data 112, and sale data 116.

In some implementations, one or more portions of the method depicted in FIG. 2 may be performed by a user device 106 rather than a server 118. For example, a user device 106 may determine purchase history data 104 associated with one or more purchase communications 108 or website accounts and include information indicative of this data in a user interface 102 without sharing this data with a server 118 or other external computing devices. As such, a portion of the data included in a user interface 102 may be private or determined using sources of data locally stored on the user device 106.

Figure 3:
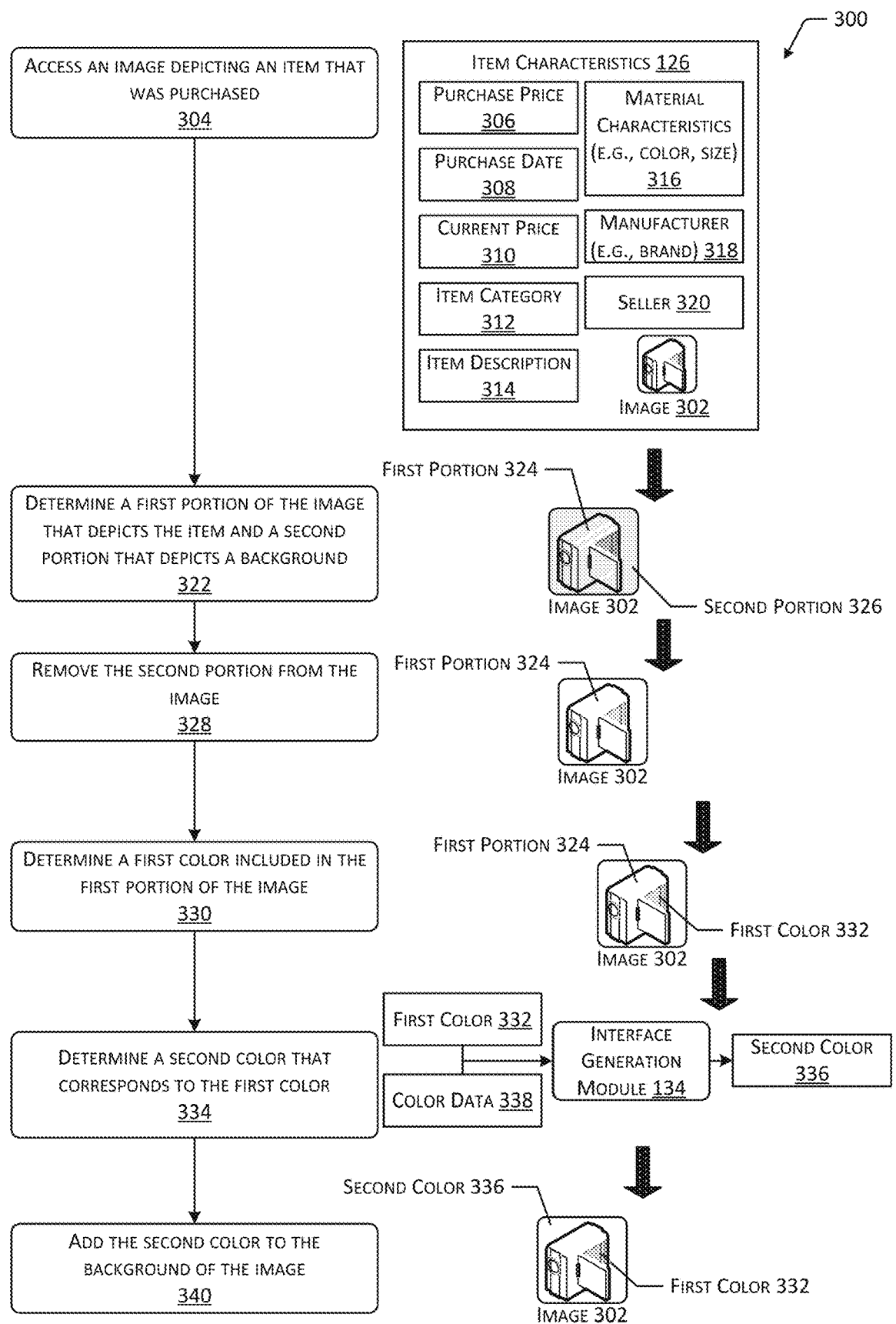
FIG. 3 is a scenario depicting a method for generating images for use in user interfaces.

FIG. 3 is a scenario 300 depicting a method for generating images 302 for use in user interfaces 102. At 304, an image 302 depicting an item that was purchased may be accessed. As described with regard to FIGS. 1 and 2, item characteristics 126 indicative of a purchased item may be determined based in part on purchase history data 104 from various possible sources. For example, item characteristics 126 may include a purchase price 306 that was paid by a user during the purchase transaction and a purchase date 308 indicative of the day, time, or both day and time during which the purchase transaction was completed. Item characteristics 126 may also include a current price 310 associated with the item. For example, a price of the item may increase or decrease over time, such that the current price 310 differs from the purchase price 306. Item characteristics 126 may further include an item category 312, which may indicate a type associated with the item, such as apparel, electronics, grocery, and so forth. In some cases, the item category 312 may include one or more sub-categories. For example, a cellular telephone may be included in a smartphones sub-category within an electronics item category 312. Item characteristics 126 may additionally include an item description 314, such as one or more of alphanumeric data, audio data, or video data that describes one or more qualities of the item. Item characteristics 126 may also include an indication of material characteristics 316 of the item, such as color, size, composition, and so forth. The item characteristics 126 may further include an indication of the manufacturer 318 or brand associated with the item and an indication of the seller 320 of the item. In some implementations, a portion of the item characteristics 126 may be determined using the purchase history data 104, while other item characteristics 126 are determined using item data 128. In other implementations, all of the item characteristics 126 may be determined using one of the purchase history data 104 or the item data 128. As such, determined item characteristics 126, such as images 302, whether modified or unmodified, may be included in user interfaces 102 to indicate an item that was purchased. In some cases, item identifiers 122 and item characteristics 126 may be determined from both purchase history data 104 and item data 128. For example, information from an e-mail confirming a purchase transaction or information obtained from a website associated with a user account for an online marketplace may include item names, item prices, images of items, or other characteristics of items that were purchased. Additionally, item data 128 received from a seller or accessed on a seller device may indicate the same characteristics of purchased items, as well as additional item characteristics 126. If at least a threshold portion of the item identifiers 122 or item characteristics 126 determined from purchase history data 104 match those determined from item data 128, this correspondence may be used to verify that an item was purchased by a user.

At 322, the image 302 may be analyzed to determine a first portion 324 that depicts the item and a second portion 326 that depicts a background. For example, an image 302 of an item obtained from a merchant system may depict the item superimposed over a background having a particular color or other characteristics. Image analysis techniques, such as computer vision, may be used to determine the edges of the depicted item, which may define a boundary between the first portion 324 and second portion 326 of the image. In some implementations, an image 302 may include multiple first portions 324, such as an item divided into multiple visible parts that are visibly separated from one another by a portion of the background. In cases where multiple images 302 of an item or multiple versions of an image 302 are accessible, an image 302 or version having the greatest size or greatest available resolution may be used facilitate location of the edges of the first portion 324. The size of the image 302 may be reduced prior to output of the image 302 in a user interface 102.

At 328, the second portion 326 may be removed from the image 302. For example, removal of the background of the image 302 may retain portions of the image 302 that depict the item itself, without other colors or features. Continuing the example, removal of the second portion 326 may include edge cutting a foreground object (e.g., the first portion 324) to form a new image including only the first portion 324. As another example, the background of the image 302 may be replaced with a transparent background layer.

At 330, a first color 332 included in the remaining first portion 324 of the image 302 may be determined. For example, K-means clustering techniques may be used to determine dominant colors within the first portion 324 of the image 302 and the relative presence of each color relative to one another. In some cases, the determined colors may be expressed as a digital red, green, and blue (RGB) value, then converted to a hue, saturation, and value (HSV) representation. In one implementation, the "colorsys" library associated with Python may be used to convert RGB values to corresponding HSV representations. When using a HSV representation, the values for V may be used to classify the determined colors. For example, values of V<20 may be classified as "black".

Use of a HSV representation may more closely align with the manner in which human vision perceives color, as contrasted to a digital red, green, and blue (RGB) value. The first color 332 that is determined may be controlled in part by one or more color rules. For example, if an item is predominantly a single color that includes small amounts of a secondary color, selection of the single color as the first color 332 may cause the image 302 to become oversaturated with the single color and hinder visualization of the item. As another example, one or more color rules may indicate that particular colors within the image are not useable as the first color 332 or that certain colors, if present, may be prioritized for use as the first color 332. As yet another example, a user preference for particular colors or the presence or absence of particular item characteristics 126 may also cause certain colors to be prioritized. For example, use of black and gray colors in conjunction with electronic items may be prioritized over use of other colors.

At 334, a second color 336 that corresponds to the first color 332 may be determined. For example, the interface generation module 134, or another module associated with the server(s) 118 or other computing device used to generate the user interface 102, may determine correspondence between the first color 332 within the image 302 and color data 338 that associates particular colors with corresponding colors. In some implementations, color data 338 may indicate the associations represented by a color wheel. For example, a color wheel may include similar colors positioned proximate to one another, and opposing (e.g., contrary) colors positioned opposite one another. In some implementations, the selected corresponding color may include a different shade of the same color as the particular color. For example, if the first color 332 is measured using a HSV value, the second color 336 may include a color within the same colored band (e.g., degree) of HSV value. Continuing the example, HSV bands may be measured in degrees, with the total number of degrees being 360, and a first color having a degree within a threshold range of the degree of a second color may be determined to be a similar color. Different colors within the same HSV band may differ in saturation (e.g., a value for S) while still being perceived by the human eye as the same type of color. For example, a depiction of an item may include bright red color while the corresponding color is a pale red or pink. In other implementations, the corresponding color may include a different color than the particular color, such as a complementary color. In addition to indicating the corresponding color, in some implementations, the color data 338 may include one or more rules that indicate weights for certain colors based on user preferences, item categories, and so forth. The color data 338 may also include rules relating to saturation of an image with particular colors or shades. For example, the color data 338 may include a threshold value, such as a threshold saturation quantity. If use of a selected color as a background color would cause the quantity of the particular color to exceed a threshold saturation quantity, the color rules may cause a different color within the image 302 to be selected or may cause the second color 336 to be provided with a lower saturation value. As another example, a saturation value for the first color 332 in the first portion 324 of the image 302 may be determined, and the saturation value for the second color 336 may be chosen based on the saturation value for the first color 332. For example, the saturation value for the second color 336 may be less than the saturation value for the first color 332 by at least a threshold amount. In cases where the image 302 does not include color, or in cases where a color that does not violate the color rules may not be determined, one or more default colors may be applied to the background.

At 340, the second color 336 may be added to at least a portion of the background of the image 302. For example, a background having selected dimensions that includes the second color 336 may be added to a foreground object to form a new image including the foreground object and selected background. As another example, an existing background color of an image may be changed or replaced using the second color 336. Use of the color data 338 to determine a second color 336 that corresponds to the first color 332 may improve the aesthetic appearance of the resulting image 302, such as by including a shade of one or more colors within the image 302, or a color that is complementary to one or more colors within the image 302, within the background thereof. Generation of images 302 in this manner may provide a user interface 102 that contains multiple images 302 with a uniform aesthetic appearance. Additionally, in some implementations, the colors added to the images 302 may be used for functional purposes, such as visually denoting the function, category, or cost of the associated item.

Figure 4:
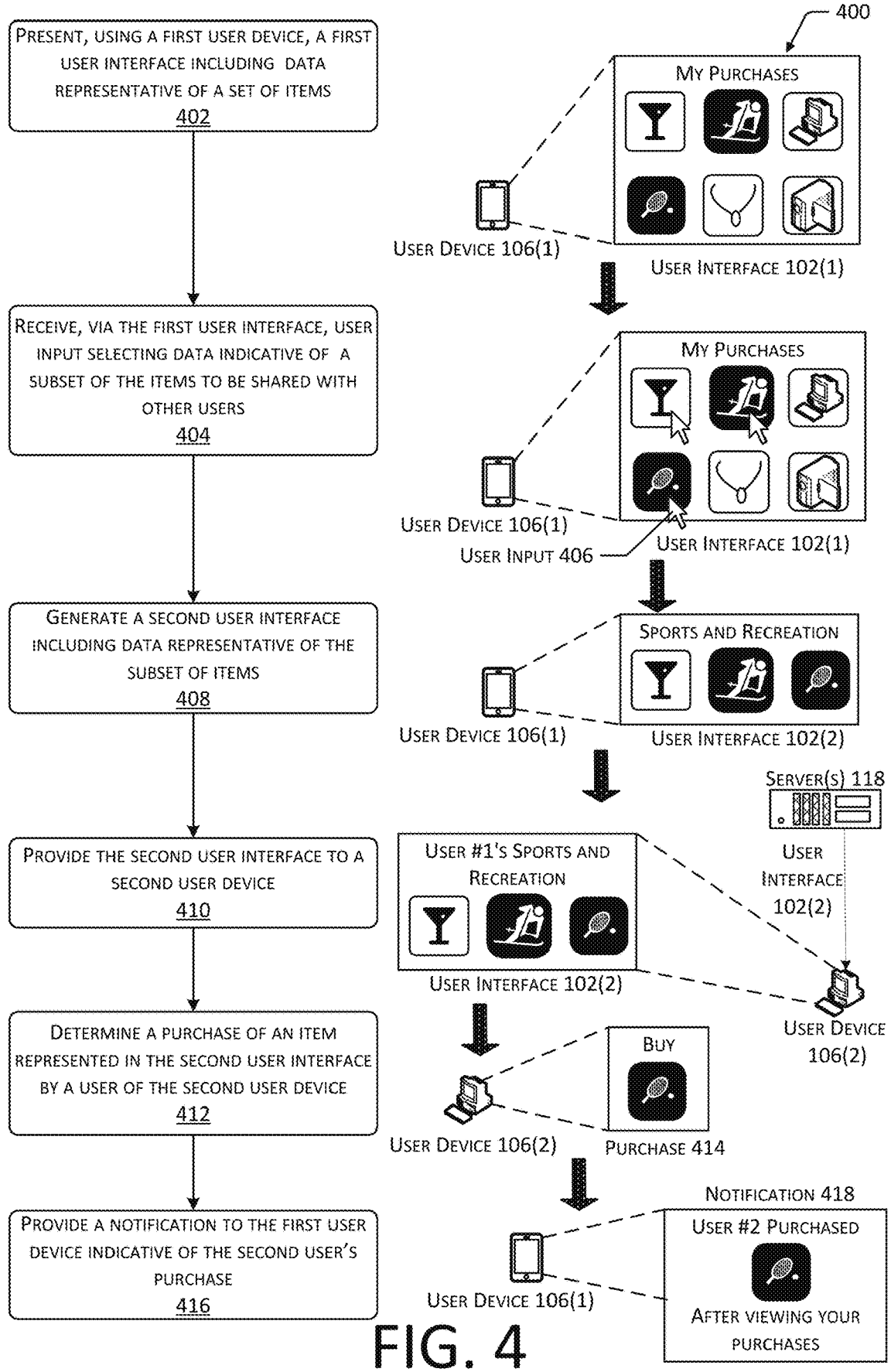
FIG. 4 depicts a scenario illustrating a method for providing at least a portion of user interface data associated with a first user to a second user to potentially influence purchases by the second user.

FIG. 4 depicts a scenario 400 illustrating a method for making at least a portion of user interface data 136 associated with a first user account accessible to a second user account to potentially influence purchases by the second user. As described previously, a user may provide user input selecting particular items or purchase transactions for inclusion in a user interface 102 that may be accessed by one or more other users. Other users viewing the user interface 102 may be influenced to purchase items presented in the user interface 102. For example, the user interface 102 may include links or other controls that may be accessed to navigate to websites associated with sellers of presented items or to initiate a purchase transaction for an item. In other cases, a user may view a user interface 102 at a first time, then purchase an item at a second time that is within a threshold length of time of the first time. When a second user purchases an item using a user interface 102 created by a first user, or subsequent to viewing a user interface 102 created by the first user, the first user may be notified regarding the purchase, and in some cases, may be compensated when other users are influenced to purchase items based on the first user's user interface 102. At 402, a first user interface 102(1) may be presented using a first user device 106(1). The first user interface 102(1) may include data representative of one or more items purchased by a user associated with the first user device 106(1). For example, the first user interface 102(1) may be generated based on purchase history data 104 associated with a user account, using the methods described with regard to FIGS. 1-3, then presented using the first user device 106(1) for access by a user to generate other user interfaces 102 to be shared with other users. Inclusion of images 302 or other item characteristics 126 determined from item data 128 may serve as an indication that the user interface 102 presents items that were actually purchased by the associated user. For example, in response to determining an item identifier 122 associated with a particular item based on a user's purchase history data 104, an image 302 of the item may be retrieved from a merchant website 110 or other source of item data 128 for inclusion in a user interface 102, thereby indicating the user's purchase of the item. While FIG. 4 depicts an example first user interface 102(1) that includes a grid structure displaying images 302 of six items, in other implementations, the first user interface 102(1) may include any number of items having any arrangement, including, without limitation, a list structure.

At 404, user input 406 may be received, via the first user interface 102(1), to select data indicative of a subset of the items presented in the first user interface 102(1) to be shared with other users. User input 406 may include a user interaction with one or more images 302 or data indicative of items presented in a list structure or other type of data structure. For example, a user may select an image 302 corresponding to an item using a mouse device, a touch interface, a keyboard, or any other type of input device. In some implementations, a user may select one or more items using audio input, movement of the user device 106(1), movement of the user's body determined by a camera, or other types of input in addition to direct interaction with the images 302 or listed items.

At 408, a second user interface 102(2) may be generated based on user interface data 136 representative of the subset of items selected via the user input 406. For example, FIG. 4 depicts a first user interface 102(1) that includes data representative of six items and user input 406 selecting data representing three items from within the first user interface 102(1). The second user interface 102(2) is shown including data representative of the three selected items. In some implementations, user input 406 may also be used to provide names or other identifiers to different subsets of items to enable selected subsets of items to be differentiated from other sets of items. For example, the second user interface 102(2) is shown including the name "Sports and Recreation", which may differentiate the collection of items associated with the second user interface 102(2) from the items shown in the first user interface 102(1), entitled "My Purchases".

At 410, the second user interface 102(2), or user interface data 136 useable to generate the second user interface 102(2), may be provided to a second user device 106(2). For example, the second user device 106(2) may request to access data associated with the user account associated with the first user device 106(1), or data associated with other users that have a relationship with the user of the second user device 106(2) may periodically be provided to the second user device 106(2) by the server(s) 118 or other computing devices that store data useable to generate the second user interface 102(2). In some implementations, the second user interface 102(2) may be generated by the second user device 106(2) itself, or another computing device in communication therewith, and the server(s) 118 may provide the data used to generate the second user interface 102(2) to the appropriate computing device(s). In other implementations, the second user interface 102(2) may be generated and provided to the second user device 106(2). The data that is provided to the second user device 106(2) may be limited to the items selected via the user input 406. For example, the user associated with the first user device 106(1) may select data indicative of certain items to be prevented from presentation to other users, certain items to be presented publicly to all other users, certain items to be presented to certain other users, or combinations thereof. The inclusion of item characteristics 126, such as images 302, determined from the purchase history data 104 used to generate the first user interface 102(1) may be used as an indication that the second user interface 102(2) presents items that were purchased by the first user.

At 412, a purchase 414 of an item represented in the second user interface 102(2) by a user of the second user device 106(2) may be determined. In some implementations, a purchase transaction may be initiated using the second user interface 102(2). For example, user input 406 from the second user device 106(2) may be used to select data representing an item indicated in the second user interface 102(2), which may enable a user of the second user device 106(2) to navigate to a website 110 or other medium through which the represented item may be purchased. In other cases, selection of an item indicated in the second user interface 102(2) may be used to initiate a purchase transaction associated with the item, such as by providing information regarding a user account associated with the second user device 106(2) and the selected item to a computing device associated with a seller 320 of the selected item. In still other cases, a user associated with the second user device 106(2) may purchase an item represented in the second user interface 102(2) through other means, such as by separately navigating to a website 110 associated with a seller of an item presented in the second user interface 102(2), and the purchase 414 of the item may be determined based on purchase history data 104 for a user account associated with the second user device 106(2). In some cases, the length of time between accessing the second user interface 102(2) and the purchase 414 of the item may be used to determine the influence of the second user interface 102(2) on the purchase 414. For example, a first timestamp indicative of a time that a user viewed the second user interface 102(2) and a second timestamp indicative of a time that the user purchased an item may be determined. The extent to which the second user interface 102(2) influenced the purchase 414 may be determined based on the difference between the timestamps.

At 416, subsequent to determination of the purchase 414, a notification 418 may be provided to the first user device 106(1) indicating the second user's purchase 414 of the indicated item. For example, the notification 418 may indicate the item that was purchased, data indicative of the user that purchased the item, and in some implementations, data indicative of the user interface 102 or collection of items that was presented to the user that may have influenced the purchase 414. In some implementations, the purchase of an item presented in the second user interface 102(2) by the second user may indicate that purchasing behaviors of the first user are influential to purchases made by the second user. In response to this determination, when the second user provides a search query or accesses another type of interface to determine items available for purchase, data indicative of purchases by the first user may be presented to the second user prior to presenting data associated with other items to the second user. For example, data associated with the first user may be presented above other data in a list or grid structure. In some implementations, the notification 418 may include information that identifies the second user, such as if the first user and the second user have manually accepted a relationship. In other implementations, the notification 418 may include information indicating that a purchase transaction was completed due to the influence of the user interface 102(2) without identifying the second user or by identifying only certain characteristics of the second user, such as the second user's city of residence.

Figure 5:
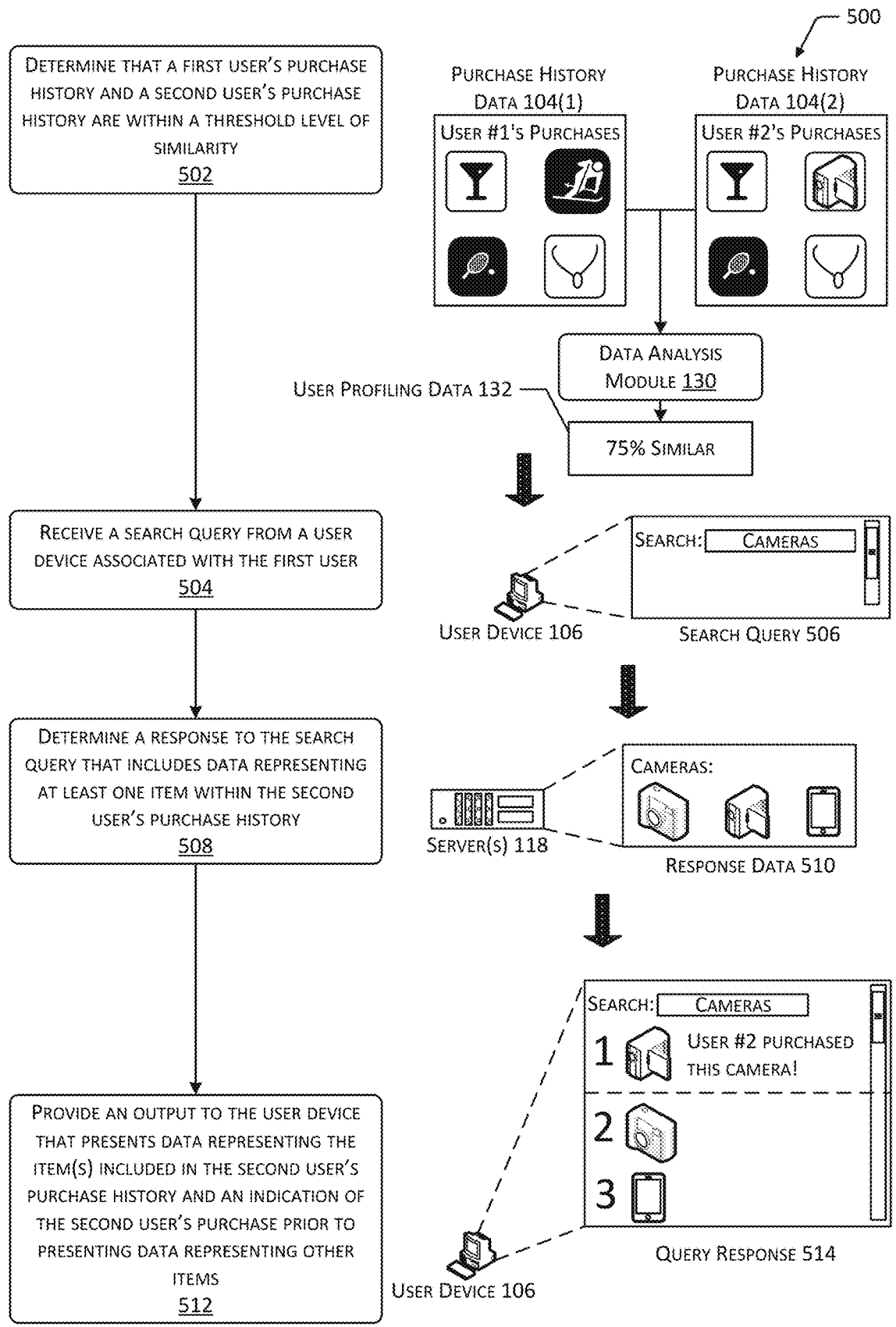
FIG. 5 is a scenario depicting a method for providing an output to a particular user that prioritizes items purchased by users having a relationship to the particular user.

FIG. 5 is a scenario 500 depicting a method for providing an output to a particular user that prioritizes items purchased by users having a relationship to the particular user. At 502, a determination may be made that a first user's purchase history and a second user's purchase history are within a threshold level of similarity. For example, purchase history data 104(1) for a first user account and purchase history data 104(2) for a second user account may be determined, such as by using the methods described with regard to FIGS. 1 and 2. Continuing the example, one or more of purchase communications 108, website data 112, or sale data 116 may be accessed, each of which may include data indicative of purchase transactions. The portions of each purchase communication 108, website data 112, or sale data 116 that include item identifiers 122 or item characteristics 126 indicative of items that were purchased may be located, such as by use of an instance-based machine learning algorithm. For example, data relevant to purchase transactions may be located based on the proximity of particular HTML tags or other types of data that precede or follow values that are relevant to a purchase transaction. Content occupying a location determined to include data relevant to purchase transactions may be used for subsequent generation of the user interface data 136. The purchase history data 104 for each user account may indicate one or more items previously purchased by the associated user. The purchases for each user account may span multiple platforms. For example, a portion of purchased items may be determined based on e-mail or other purchase communications 108, a portion of purchased items may be determined based on purchase history data 104 from a website 110, and a portion of purchased items may be determined based on data received from a point of sale 114 or another computing device in communication with the point of sale 114.

FIG. 5 depicts example purchase history data 104(1) for a first user account that includes four purchased items, and example purchase history data 104(2) for a second user that includes four purchased items, three of which are identical to those included in the first purchase history data 104(1). A data analysis module 130 associated with one or more servers 118 or other computing devices may determine correspondence between the first purchase history data 104(1) and the second purchase history data 104(2) to determine user profiling data 132 indicating a level of similarity between the purchase histories of the user accounts. In some implementations, a level of similarity between users may be determined based on purchases of similar categories of items, purchases of similar brands or manufacturers, or purchases that occur at similar dates or times. For example, if two users purchased at least a threshold quantity or threshold percentage of similar items, the user accounts may be grouped together as similar. As another example, similarity may be measured as a numerical value. Continuing the example, two user accounts for which 65% of previously purchased items are similar may be indicated as 65% similar. User accounts having purchase histories within a threshold level of similarity may be classified within a group of user accounts. Two user accounts that belong to the same group may have a relationship with one another by virtue of being within the same group. In other implementations, relationships between user accounts may be determined using other criteria. For example, user accounts that are associated via a social network, geographic proximity, familial relationships, or demographic characteristics may be determined to have a relationship in addition to or independent of commonalities between their respective purchase histories. In some cases, if a large number of users share common purchase histories, geographic criteria may be used to prune a group of related users. For example, if a large number of users have purchased the same three electronic items, a group of related users may include users who have purchased the three items and reside within one hundred miles of each other. In still other implementations, relationships between user accounts may be manually generated. For example, a user may provide user input selecting a particular user account of interest, and a relationship between the user account of the selecting user and the selected user account may be generated. As another example, a user may manually engage in a relationship with another user by electing to follow the user interfaces 102 created by the other user, or by electing to create user interfaces 102 that are accessible to the other user.

At 504, a search query 506 may be received from a user device 106 associated with one of the user accounts. A search query 506 may include one or more alphanumeric strings, audio data, video data, or other methods for selecting search criteria, such as selection of text or images presented in a user interface 102. A search query 506 may be processed by determining correspondence between one or more terms of the search query 506 and a plurality of items available for purchase. For example, FIG. 5 depicts a search query 506 that includes the alphanumeric string "Cameras", responsive to which photographic items and computing devices that include cameras may be determined and used to generate an output.

At 508, a response to the search query 506 may be determined. In some cases, response data 510 useable to generate a response may include data representing at least one item that is also included in the purchase history data 104(2) of another user. For example, FIG. 5 depicts the response data 510 including an item that is also included in the second purchase history data 104(2).

At 512, an output may be provided to the user device 106. The output may present data representing the item(s) determined from the second purchase history data 104(2) prior to presenting data representing other items. The output may also include an indication of the purchase associated with the item(s) from the second purchase history data 104(2). For example, the interface generation module 134 or another module associated with the computing device generating the query response 514 may determine correspondence between the response data 510 and the purchase history data 104(2) for one or more user accounts to determine items in the response data 510 that are also included in the purchase history data 104(2). For example, the response data 510 may include data indicative of multiple items that are responsive to the search query 506, a portion of which are also represented in the purchase history data 104(2) for the second user. Correspondence between the response data 510 and the purchase history data 104(2) may include a determination of the items that are common between both the response data 510 and the purchase history data 104(2). The query response 514 may then modify the manner in which items included in the purchase history data 104(2) are presented relative to other items. For example, data representing items included in the purchase history data 104(2) may be presented prior to data representing other items. Continuing the example, data representing items from the purchase history data 104(2) may be presented in a selected location within the output, such as above data representative of other items. As another example, data representing items from the purchase history data 104(2) may be provided with one or more selected visible characteristics, such as colors, fonts, and so forth. Continuing the example, FIG. 5 depicts a query response 514 in which data representing an item included in the second purchase history data 104(2) is presented prior to data representing other items, such as by positioning the data from the second purchase history 104(2) vertically above and visibly separated from other data. The data representing the item is also shown accompanied by a notification indicating the user that the second user previously purchased the item. In other implementations, notifications may indicate counts of users that purchased the item, such as a number of related users or a percentage of related users that purchased the item. For example, a notification may indicate that "63% of your social network contacts purchased this item" or "71% of users with similar purchasing habits in your city purchased this item". In still other implementations, response data 510 may be used to generate an output that presents data in an order based on levels of similarity between user accounts. For example, based on purchase history data 104, first user account may be determined to be 85% similar to a particular user account, while a second user account is determined to be 72% similar and a third user account is determined to be 61% similar. An output presented using a user device 106 associated with the particular user account may present data associated with the first user account prior to data associated with the second user account, which may be presented prior to data associated with the third user account. In some implementations, selection of an item presented in the query response 514 may be used to navigate to a webpage or other type of interface associated with the item or a seller 320 of the item. In some cases, selection of an item presented in the query response 514 may be used to initiate a purchase transaction associated with the item.

Figure 6:
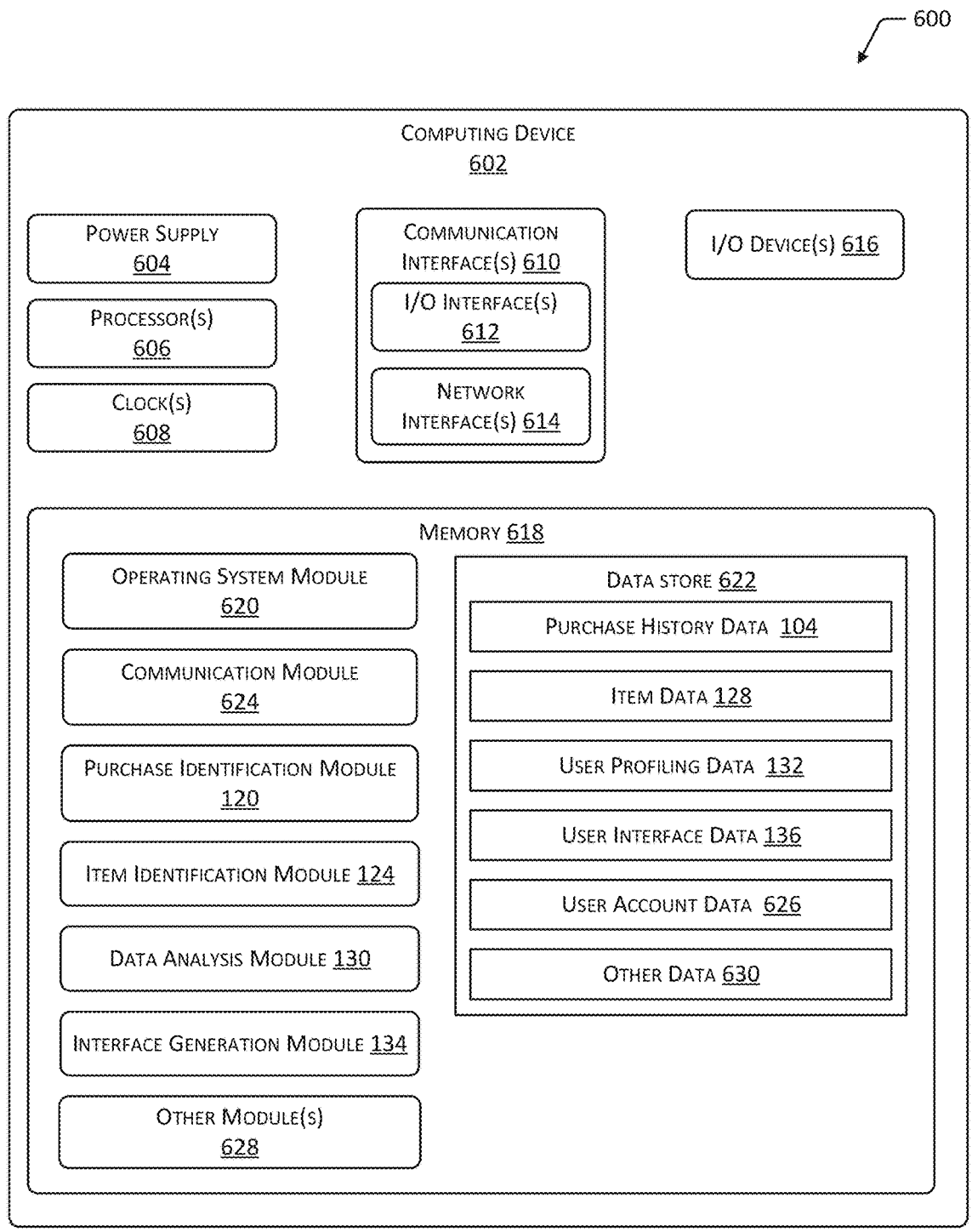
FIG. 6 is a block diagram depicting a computing device within the present disclosure.

FIG. 6 is a block diagram 600 depicting a computing device 602 within the present disclosure. The computing device 602 may include one or more servers 118, one or more user devices 106, or one or more other computing devices 602 in communication with a user device 106. While FIG. 6 depicts a single block diagram 600 representative of a computing device 602, any number of networked computing devices 602 may perform the implementations described herein. For example, a first portion of the functions described herein may be performed by a server 118, while a second portion of the functions are performed by a user device 106 that receives data from the server 118.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input device or output device associated with the computing device 602. For example, I/O devices 616 may include touch sensors, keyboards, mouse devices, microphones, image sensors (e.g., cameras), scanners, displays, speakers, haptic devices, printers, and so forth. In some implementations, the I/O devices 616 may be physically incorporated with the computing device 602 or may be externally placed.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

The communication module 624 may be configured to establish communications with one or more other computing devices 602. Communications may be authenticated, encrypted, and so forth.

The memory 618 may also store the purchase identification module 120, which may be used to determine purchase history data 104 based on one or more of purchase communications 108, website data 112, and sale data 116. For example, the purchase identification module 120 may determine correspondence between an address or domain associated with an e-mail and seller data indicative of addresses or domains associated with sellers 320, which may indicate whether the e-mail is associated with a purchase transaction. As another example, the purchase identification module 120 may analyze the content of an e-mail for alphanumeric strings or other types of data indicative of purchase transactions, such as an indication of a SKU identifier or an item price. In some cases, the purchase identification module 120 may remove extraneous data, empty elements, design elements, and so forth from a purchase communication 108 to convert the communication into a list or other data structure containing potentially relevant elements, which may then be analyzed to determine whether the communication is associated with a purchase transaction. As yet another example, the purchase identification module 120 may access a website account associated with an e-commerce website 110 and determine the location of a purchase history associated with the website account. As another example, the purchase identification module 120 may determine the location of purchase history data 104 within sale data 116 received from a point of sale 114. In some implementations, the purchase identification module 120 may utilize one or more machine learning algorithms to locate and extract item identifiers 122, and in some cases item characteristics 126, from purchase communications 108, website data 112, and sale data 116, and to differentiate purchase history data 104 from other data.

The memory 618 may additionally store the item identification module 124. The item identification module 124 may determine item characteristics 126 associated with the items determined from the purchase history data 104. For example, the item identification module 124 may determine correspondence between the item identifiers 122 determined by the purchase identification module 120 and item data 128 that associates item identifiers 122 with corresponding item characteristics 126. In some cases, one or more item characteristics 126 may also be determined from the purchase history data 104. For example, purchase history data 104 may indicate a date of purchase and a purchase price 306. Other item characteristics 126 may include a current price 310, one or more images 302 depicting the item, text describing the item, material characteristics 316 of the item, and so forth. In some implementations, the item identification module 124 or another module associated with the computing device 602 may receive item data 128 from merchant systems or other types of computing devices 602 associated with sellers 320. For example, item data 128 from a seller 320 may periodically be received to replace existing item data 128 or update existing item data 128 with additional item data 128. In some implementations, the item identification module 124 or another module may determine correspondence between information regarding a purchase of an item determined from purchase history data 104 and information regarding the item determined from item data 128 to verify that the item was purchased. For example, if information determined from an e-mail confirming a purchase transaction matches at least a threshold portion of information regarding the item determined from item data 128, this may verify that the item was purchased.

The memory 618 may further store the data analysis module 130. The data analysis module 130 may determine correspondence between the purchase history data 104 for multiple user accounts to classify user accounts into groups based on similarities in purchase history data 104. For example, the data analysis module 130 may determine user profiling data 132 indicative of dates and times of purchases, types of items purchased, brands or manufacturers of items purchased, prices of items purchased, and so forth, to generate a user profile indicative of the purchasing behaviors of a user account. User accounts that have purchasing behaviors that are within a threshold level of similarity of one another may be associated with a group of user accounts. In some implementations, the data analysis module 130 may also determine geographic or demographic characteristics associated with user accounts, based on user account data 626 that may include a location or other demographic information associated with a user account. Geographic or demographic characteristics may also be used to associate users within groups of related user accounts.

The memory 618 may also store the interface generation module 134. The interface generation module 134 may determine user interface data 136 that may be used by the computing device 602 or another computing device 602 in communication therewith, such as a user device 106, to generate one or more user interfaces 102 based on the item characteristics 126 determined from the purchase history data 104. For example, the user interface data 136 may be used to generate a user interface 102 presenting a list that includes an item identifier 122 for an item, shown adjacent to one or more item characteristics 126 related to the item. As another example, the user interface data 136 may be used to generate a user interface 102 presenting a grid that includes images 302 of items. For example, item characteristics 126 for an item may include one or more images 302 of the item. In some implementations, the interface generation module 134 may modify one or more images 302 prior to presentation of the images 302 in a user interface 102. For example, as described with regard to FIG. 3, the interface generation module 134 may determine correspondence between a color of the item and color data 338 that associates colors within the image with corresponding colors, then provides a corresponding color to the background of the image 302. Modification of multiple images 302 in this manner may provide a user interface 102 with a uniform aesthetic appearance, while colors associated with images 302 may indicate item characteristics 126 such as an item category 312 or price.

In some implementations, the interface generation module 134, or another module of the computing device 602, may be configured to receive user input 406 and determine user interface data 136 for generation of additional user interfaces 102 based on the user input 406. For example, user input 406 received via a user interface 102 may be used to select particular items for inclusion in a subsequent user interface 102, as described with regard to FIGS. 7 through 10.

In some implementations, the interface generation module 134, or another module of the computing device 602, may determine correspondence between a search query 506 and item data 128 to generate a response to the search query 506. The interface generation module 134 may also determine correspondence between the response data 510 and purchase history data 104 for one or more user accounts to determine particular items that were purchased by particular users. The interface generation module 134 may generate a query response 514 that prioritizes the items included in the purchase history data 104, such as by presenting these items prior to presenting other items.

In some implementations, the interface generation module 134 may include one or more links in a user interface 102 or query response 514. User input selecting a link may be used to navigate to a webpage associated with an item or a seller 320 of an item, or to initiate a purchase transaction for an item. For example, one or more of the item data 128 or purchase history data 104 may include data that may be used to generate a link, such as an internet address associated with a seller 320. As another example, in response to selection of a link or other type of control, user account data 626 indicative of the user account associated with selection of an item may be provided to a computing device 602 associated with a seller 320 of the item. The user account data 626 that is provided may include information that may be used to initiate a purchase transaction, such as information indicative of a user account associated with a seller website 110, a user name or address, user payment information, user shipping information, and so forth.

Other modules 628 may also be present in the memory 618. For example, encryption modules may be used to encrypt and decrypt communications between computing devices 602. Authentication modules may be used to authenticate communications sent or received by computing devices 602. Other modules 628 may further include a user input module, which may be configured to receive and process user input 406. Other modules 628 may additionally include modules for periodically requesting or receiving data from websites 110, communication servers 109, points of sale 114, user devices 106, and so forth. For example, item data 128 may periodically be received from websites 110 associated with sellers 320, while purchase communications 108 may periodically be received from communication servers 109.

Other data 630 within the data store(s) 622 may include user input data, such as configurations and settings associated with computing devices 602. Other data 630 may include encryption keys and schema, access credentials, and so forth. Other data 632 may also include rules and configurations for generating images 302 and user interfaces 102, such as threshold values for determining maximum saturation values or other values associated with particular colors for an image 302 or threshold levels of similarity necessary to determine a relationship between user accounts.

In different implementations, different computing devices 602 may have different capabilities or capacities. For example, servers 118 may have greater processing capabilities or data storage capacity than user devices 106.

Figure 7:
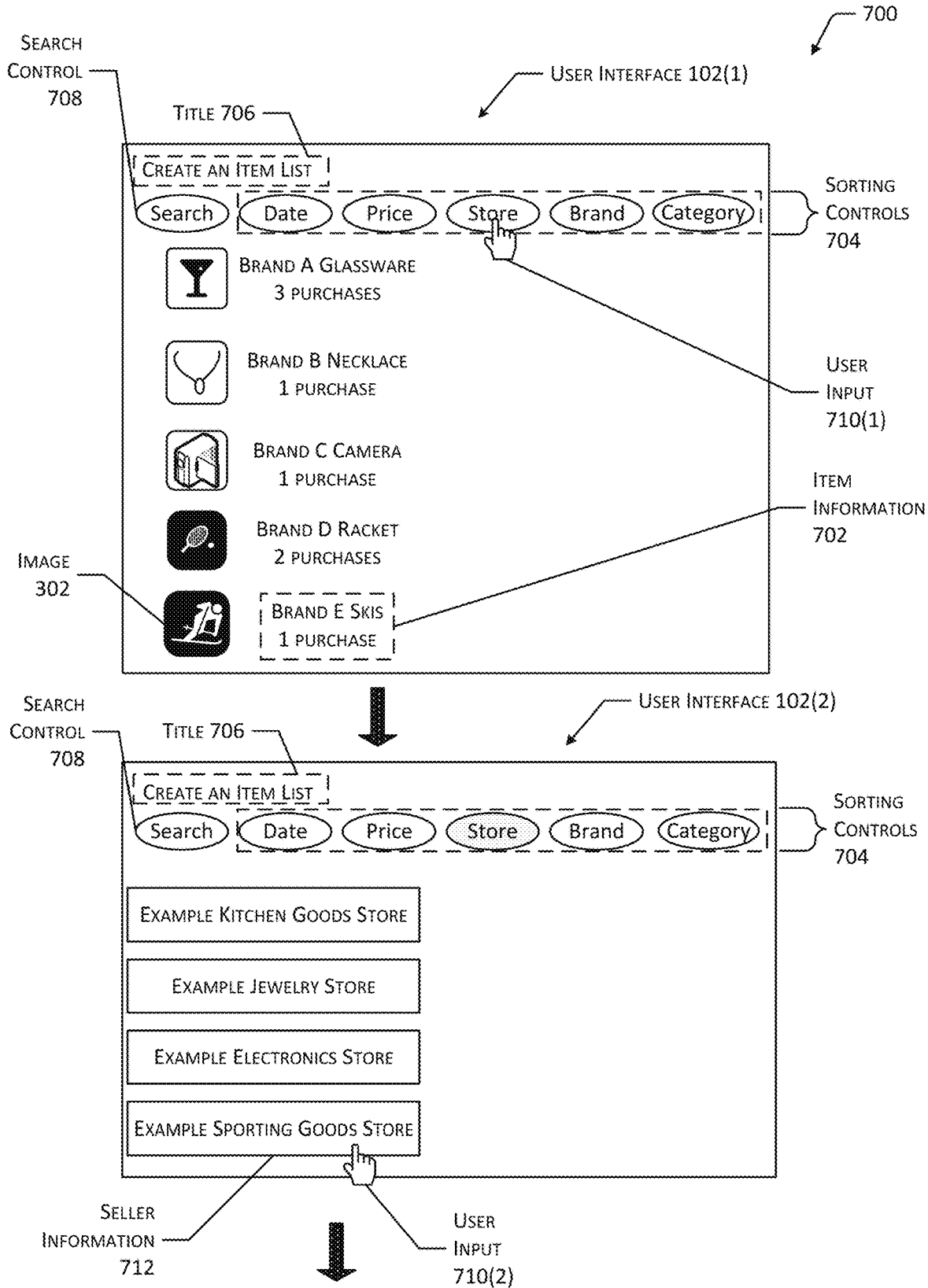
FIGS. 7-10 are diagrams illustrating example user interfaces that may be used by a first user to select items for inclusion in a separate user interface that may be shared with other users.

FIG. 7 is a diagram 700 illustrating example user interfaces 102 that may be used by a first user to select items for inclusion in a separate user interface 102 that may be shared with other users. For example, by sharing a user interface 102 with other users, such as by making the user interface 102 publicly accessible or accessible to one or more other users or groups of users, the user interface 102 may function as a recommendation or endorsement, by the first user, for the items presented in the user interface 102. Continuing the example, as described previously, the inclusion of items that have been verified to have been purchased by a user in a user interface 102 may influence other users to consider purchasing the presented items. Additionally, when the first user specifically selects particular items for inclusion in a user interface 102 to be shared with other users, the selection and presentation of these particular items may represent a recommendation or endorsement of the items by the first user, further influencing other users to consider purchasing the items. As described previously, purchase history data 104 for a user account may be determined from a variety of sources, such as purchase communications 108, website data 112, sale data 116, and so forth. The purchase history data 104 may indicate particular items that have been purchased by a user. Based on correspondence between the purchase history data 104 and item data 128 that associates items with characteristics of the items, information regarding the particular items that were purchased may be determined. Information regarding an item may be determined from both the purchase history data 104 and the item data 128. For example, information regarding an item may include item characteristics 126 such as a purchase price 306 and purchase date 308, a current price 310 of the item, an item category 312, an item description 314, material characteristics 316 of the item, a manufacturer 318 (e.g., brand) associated with the item, a seller 320 of the item, one or more images 302 of the item, and so forth. In some cases, this information may be determined from purchase history data 104, such as a confirmation e-mail or information available by accessing a seller website. In other cases, this information may be determined from a seller 320, such as by accessing item data 128 associated with a seller device or previously received from a seller device. As described, previously, in some implementations, information determined from purchase history 104 and information determined from item data 128 may be compared to verify items that were purchased by a user.

When a first user accesses a first user interface 102(1), information determined from the purchase history data 104 for the first user and item data 128 associated with items purchased by the first user may be presented. For example, the first user interface 102(1) may present images 302 of items adjacent to item information 702 for the corresponding item, such as an item name, an indication of a brand or manufacturer 318 of the item, a number of times that the first user or one or more other users has purchased the item, and so forth. The items may initially be presented in any order, such alphabetical order, an order arranged by date of purchase, an order arranged by category or other characteristics of the items, and so forth. The user interface 102(1) may include sorting controls 704 that may be used to control the arrangement of the items. For example, selection of a "Date" sorting control 704 may cause the items to be presented in an order based on the date that the items were purchased. Selection of a "Price" sorting control 704 may cause the items to be presented in an order based on the purchase price 306 or current price 310 of the items. Selection of a "Store" sorting control 704 may cause the items to be presented in an order based on the sellers 320 associated with the items. Selection of a "Brand" sorting control 704 may cause the items to be presented in an order based on the brand or manufacturer 318 associated with the items. Selection of a "Category" sorting control 704 may cause the items to be presented in an order based on the type or category associated with the items. In some implementations, use of "Store" or "Brand" sorting controls 704 may cause items associated with particular sellers 320 or brands to be presented while other items are not presented in the user interfaced 102(1). The user interface 102(1) may also include a title 706 indicative of the function of the user interface 102(1) or instructions associated with the user interface 102(1) and a search control 708 that may be used to search for one or more items, such as by use of keywords or other filters. The user interface 102(1) may also include features for scrolling or navigating to show additional items. For example, while FIG. 7 depicts the user interface 102(1) presenting images 302 and item information 702 for five items, the particular items that are displayed may be changed by scrolling, selecting controls to navigate to different pages of the user interface 102(1), and so forth.

In the example shown in FIG. 7, user input 710(1) may be provided to a sorting control 704 that functions to sort or present items based on the "Store" or seller 320 associated with the item. User input 710(1) may include selection using a touch input, keyboard, mouse device, audio input device, camera, or other type of input device. In response to the user input 710(1), a second user interface 102(2) may be generated that presents the sellers 320 associated with the purchase history data 104 of the first user.

Specifically, FIG. 7 depicts a second user interface 102(2) that includes the title 706, search control 708, and sorting controls 704 that were presented in the first user interface 102(1). In some implementations, an indication of a selected sorting control 704 may be included in the user interface 102(2). For example, in response to user input 710(1) selecting the "Store" sorting control 704 in the first user interface 102(1), the second user interface 102(2) may show the "Store" sorting control 704 with a particular color, pattern, or other visible indication indicating selection thereof. The second user interface 102(2) may present seller information 712 indicative of one or more sellers 320 associated with the items represented in the purchase history data 104. For example, seller information 712 may include names, logos, or other identifiers associated with particular sellers 320. In some implementations, seller information 712 may include information associated with the items that were purchased from particular sellers 320, the types of items available for purchase from particular sellers 320, and so forth. FIG. 7 depicts user input 710(2) provided to the second user interface 102(2) that selects a particular item of seller information 712. User input 710(2) indicating seller information 712 may be used to generate or navigate to a subsequent user interface 102(3) that presents items associated with a seller 320 that corresponds to the selected seller information 712.

Figure 8:
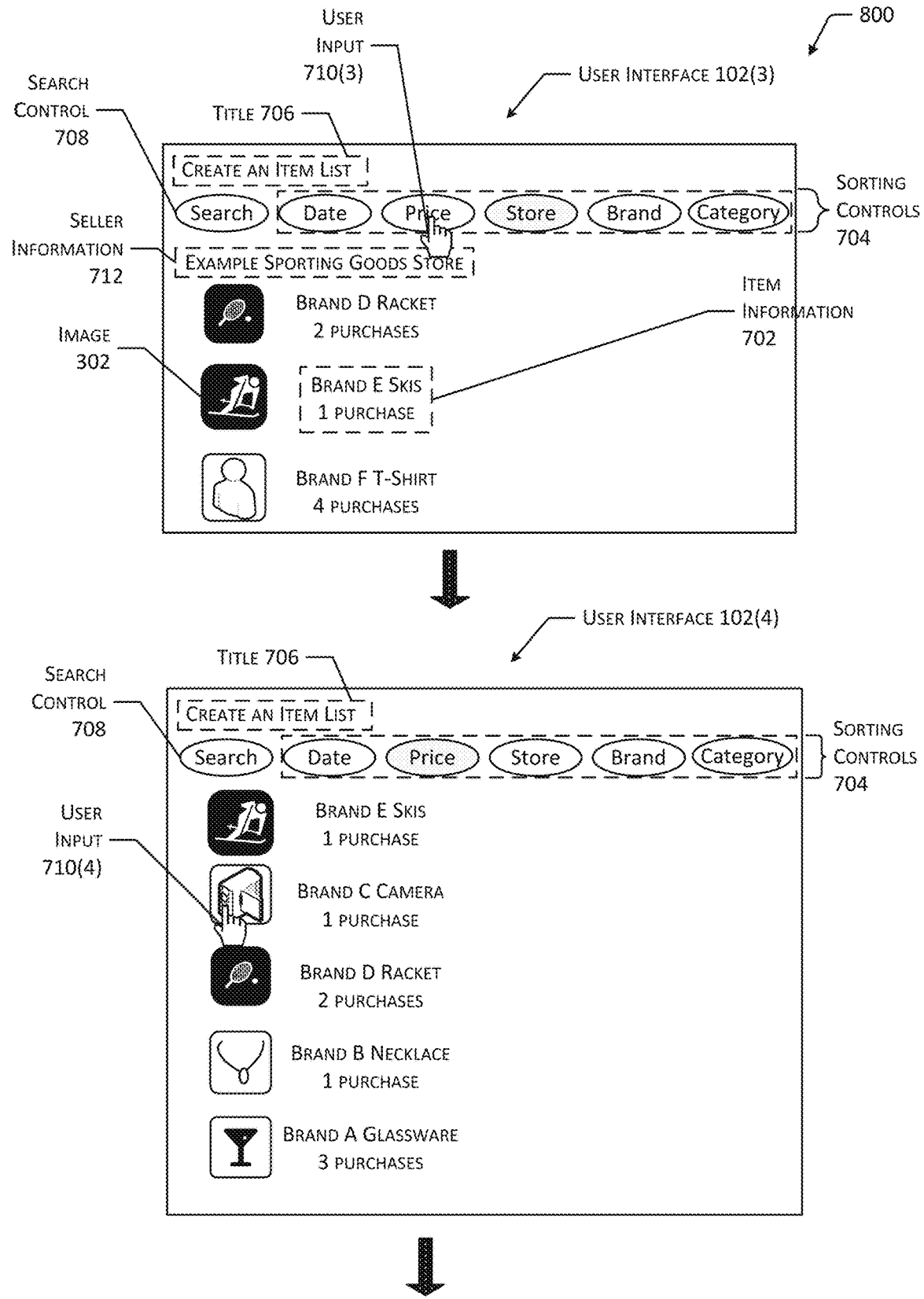

For example, FIG. 8 depicts diagrams 800 showing a third user interface 102(3) that may be presented after receiving user input 710(2) via the second user interface 102(2), and a fourth user interface 102(4) that may be presented after receiving user input 710(3) via the third user interface 102(3). The third user interface 102(3) is shown including the title 706, sorting controls 704, and search control 708 presented in the first and second user interfaces 102. The third user interface 102(3) is also shown including seller information 712 that corresponds to the seller information 712 that was selected in the second user interface 102(2), such as the name of a particular seller 320. In some implementations, the seller information 712 presented in the third user interface 102(3) may differ from the seller information 712 presented in the second user interface 102(2). For example, the second user interface 102(2) may present a logo, icon, or image associated with a seller 320, while the third user interface 102(3) may present the name of a seller 320 using text.

The third user interface 102(3) is also shown presenting a subset of the images 302 and item information 702 presented in the first user interface 102(1), as well as one or more additional images 302 and item information 702 that may not have been visible in the initial set of items presented in first user interface 102(1). The subset of images 302 and item information 702 may correspond to items available for purchase from the seller 320 associated with the selected seller information 712. FIG. 8 also shows additional user input 710(3) selecting a different sorting control 704 that may arrange items based on the purchase price 306 or current price 310 thereof.

In response to the user input 710(3) that selects the "Price" sorting control 704, FIG. 8 depicts a fourth user interface 102(4) showing item images 302 and item information 702 arranged in an order that corresponds to the price of the items. In some implementations, a "Price" sorting control 704 may arrange items based on a purchase price 306 of the items determined from the purchase history data 104, while in other implementations, the "Price" sorting control 704 may arrange items based on a current price 310 of the items determined from the item data 128. In some implementations items may be arranged in order of increasing price, while in others, items may be arranged in order of decreasing prices. In still other implementations, a user interface 102 may include multiple sorting controls 704 relating to item prices, such as separate sorting controls 704 for purchase price 306 and current price 310, or selectable sorting controls 704 for arranging items by price in increasing or decreasing order.

Item images 302, item information 702, or other controls or regions of the user interface 102(4), such as a button, link, or selector corresponding to an item, may be used to indicate particular items displayed in the user interface 102(4). For example, user input 710(4) may be used to select one or more items for inclusion in a separate user interface 102 that may be accessed and viewed at a future time or made accessible to other users. Continuing the example, FIG. 8 depicts user input 710(4) indicating an image 302 that corresponds to a particular item.

Figure 9:
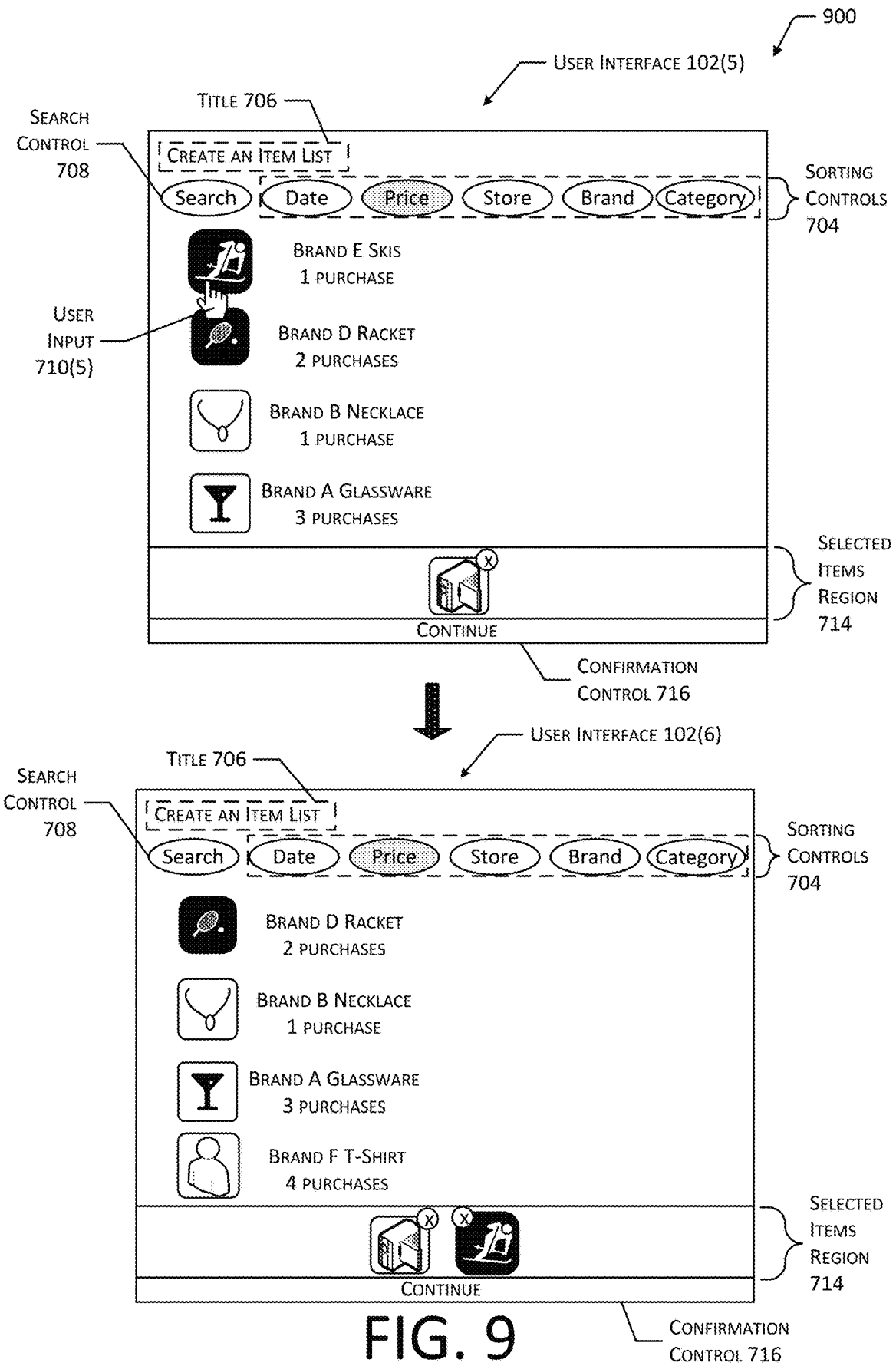

FIG. 9 depicts diagrams 900 showing a fifth user interface 102(5) and sixth user interface 102(6) that illustrate a selection process for indicating items to be included in a separate user interface 102 for future access by one or more users. For example, a first user may wish to generate a user interface 102 that displays a portion of the items previously purchased by the first user, then share that user interface with one or more second users, who may be influenced to purchase items based on the user interface. In some implementations, the shared user interface may include links or other controls that may be used by the second user(s) to initiate a purchase transaction or navigate to a webpage associated with an item or a seller 320 of the item.

For example, in response to the user input 710(4) selecting an item, shown in FIG. 8, the image 302 corresponding to the selected item may be presented in a selected items region 714 of the user interface 102(5). In some implementations, selection of an item by user input 710(4) may cause the selected item that is presented in the selected items region 714 to be removed from display in the portion of the user interface 102(5) presenting other items for selection. Additionally, in some implementations, selection of an item image 302 or other control feature for an item presented in the selected items region 714 may cause the indication of the item to be removed from the selected items region 714 and presented in the list of other items. In some cases, item images 302 may be moved into and from the selected items region 714 by a gesture or other form of manual user input 710, such as by dragging and dropping the images 302 associated with the items. Additional user input 710(5) may be used to select additional items for inclusion in the selected items region 714.

For example, FIG. 9 depicts a user interface 102(6) subsequent to receipt of user input 710(5) selecting a second item, in response to which the image 302 associated with the second item may be presented in the selected items region 714 and in some cases, removed from display in another portion of the user interface 102(6). Any number of items may moved into and from the selected items region 714. A user may indicate completion of the selection of a set of items for inclusion in a separate user interface 102 by providing user input 710 to a confirmation control 716, such as a button or selector positioned proximate to the selected items region 714.

Figure 10:
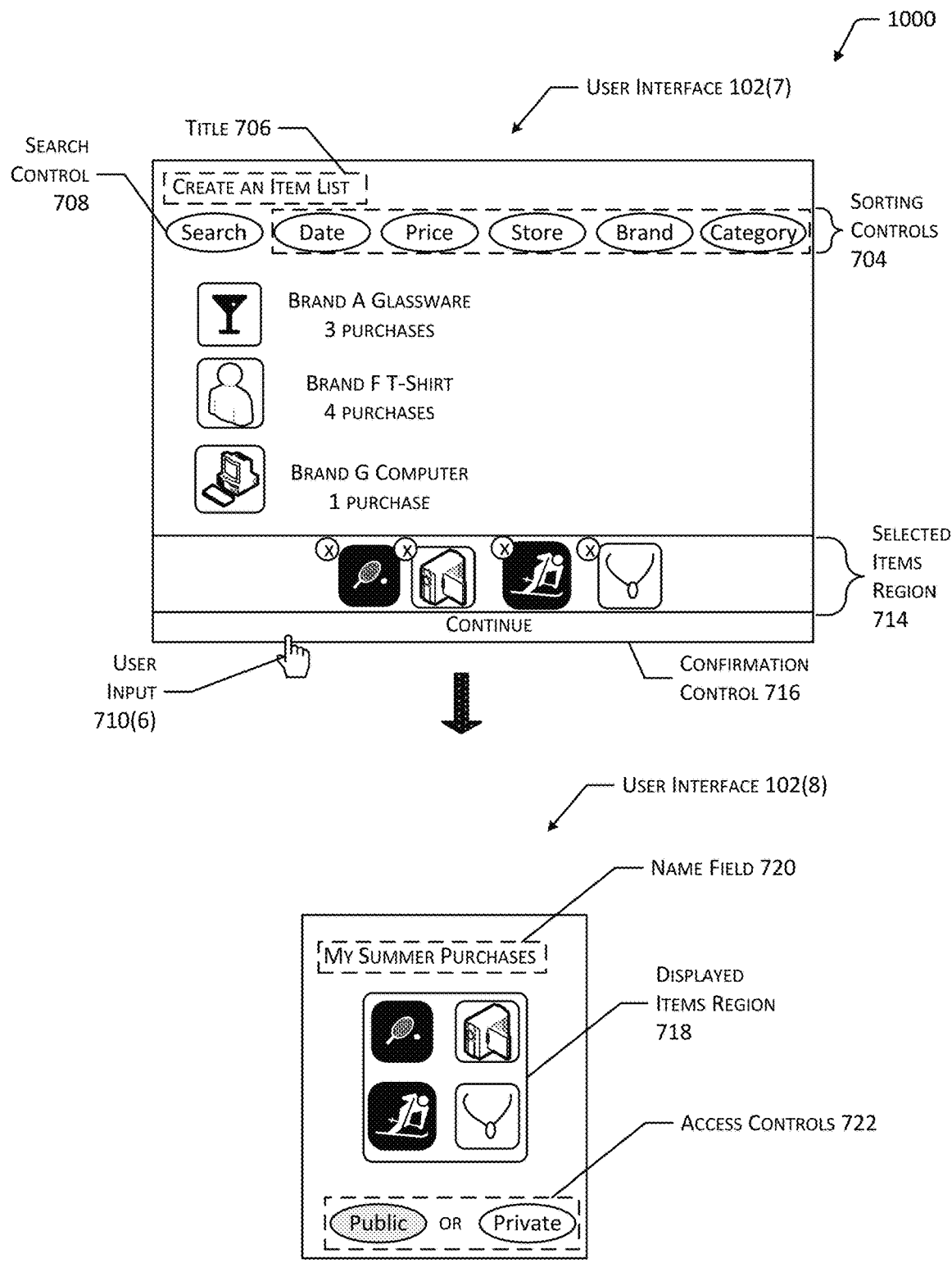

FIG. 10 depicts a diagram 1000 illustrating selection of items via a user interface 102(7) for inclusion in a separate user interface 102(8) that may be accessed by a user at a future time or made accessible to other users. The user interface 102(7) is shown including the title 706, search control 708, and sorting controls 704 shown in FIGS. 7-9, as well as images 302 and item information 702 associated with one or more items. Additionally, the user interface 102(7) is shown presenting images 302 associated with four items in the selected items region 714. The items may be selected, for example, using the process described with regard to FIGS. 8 and 9. User input 710(6) may be provided to the confirmation control 716 to indicate completion of the item-selection process.

In response to the user input 710(6), a user interface 102(8) may be generated that presents a displayed items region 718 including each of the items that was presented in the selected items region 714. In some implementations, the displayed items region 718 may include navigational controls to scroll or select different pages, such as if the number of items in the selected items region 714 is too large to be presented in a single display area. In some implementations, user input 710 may be used to arrange the items presented in the displayed items region 718. The user interface 102(8) may also include a name field 720, which may receive user input 710 that indicates a name, title, or other identifier to be associated with the displayed items region 718. The user interface 102(8) may additionally include access controls 722, which may be used to control whether the user interface 102 that includes the displayed items region 718 will be accessible to other users. FIG. 10 depicts the access controls 722 including a "Public" button or selector and a "Private" button or selector, which may be used to control whether the user interface 102 is accessible to other users or only the user account associated with generation of the user interface 102. In other implementations, access controls 722 may be used to select particular user accounts, groups of user accounts, or characteristics of user accounts that may be permitted to access the user interface 102, while other user accounts may be prevented from access. As described previously, another user accessing the user interface 102(8) may purchase an item using the user interface 102(8), such as by selecting an image 302 associated with the item, which may navigate to a seller website or initiate a purchase transaction. Alternatively, another user may view the user interface 102(8) at a first time, then purchase an item presented in the user interface 102(8) at a second time within a threshold length of time of the first time. For example, user interaction data associated with a user account may indicate that a user has accessed and viewed the user interface 102(8), while purchase history data 104 for that user account may indicate that the user account has purchased one or more items presented in the user interface 102(8). Correspondence between the user interface data 136 associated with the user interface 102(8) and the purchase history data 104 associated with the user account may indicate that the user interface 102(8) influenced the purchase of the item. In such a case, a notification 418 indicative of the influenced purchase may be provided to the user that created the user interface 102(8). In some implementations, the user account associated with the user interface 102(8) may be compensated or incentivized to create user interfaces 102 to influence purchases by other users.

The following clauses provide additional description of various implementations:

Clause 1: A system comprising: one or more memories storing computer-executable instructions; and one or more hardware processors to execute the computer-executable instructions to: receive item data from a first device associated with a seller, wherein the item data associates an item identifier indicative of an item with one or more characteristics of the item and the one or more characteristics include one or more of an item name, an image depicting the item, a price associated with the item, or data descriptive of the item; access purchase history data associated with a first user account, wherein the purchase history data is indicative of a first purchase of the item; determine, based on the purchase history data, the item identifier indicative of the item; determine correspondence between the item identifier of the item data and the item identifier determined from the purchase history data; in response to the correspondence, determine, based on the item data, the one or more characteristics of the item that are associated with the item identifier; determine first user interface data for causing a second device associated with the first user account to present a first user interface including at least a subset of the one or more characteristics; provide the first user interface data to the second device; receive user input from the second device selecting the first item for inclusion in a second user interface; in response to the user input, determine second user interface data for causing a third device associated with a second user account to present the second user interface; determine access to the second user interface by the third device; determine a second purchase of the item associated with the second user account; and generate a notification indicative of the second purchase.

Clause 2: The system of clause 1, further comprising computer-executable instructions to: access an electronic communication associated with the first user account; determine correspondence between a source of the electronic communication and seller data that associates the source with a seller of the item; determine, based on the correspondence between the source and the seller data, that the electronic communication is associated with the first purchase of the item; and in response to the correspondence between the source and the seller data, determine a portion of the electronic message that includes the item identifier.

Clause 3: The system of clause 1 or 2, further comprising computer-executable instructions to: determine a website account associated with the first user account; provide access information to a computing device associated with the website account; determine one or more of an address or link within a website associated with the website account, wherein the one or more of the address or link is associated with output of the purchase history data; access website data associated with the one or more of the address or the link; and receive the purchase history data from the website.

Clause 4: The system of any of clauses 1 through 3, further comprising computer-executable instructions to: determine a relationship between the second user account and the first user account; wherein the second user interface data is configured to generate the second user interface with an ordered presentation in which the at least a subset of the one or more characteristics is presented at a first location positioned prior to a second location that includes data associated with at least one other item, and wherein the second user interface includes a link that is accessible to one or more of initiate a purchase transaction for the item or navigate to a webpage associated with the item.

Clause 5: The system of clause 4, further comprising computer-executable instructions to: determine correspondence between the purchase history data associated with the first user account and purchase history data associated with the second user account, wherein the correspondence exceeds a threshold level of similarity; and determine the relationship between the first user account and the second user account in response to the correspondence exceeding the threshold level of similarity.

Clause 6: The system of clause 4 or 5, wherein the notification comprises information that identifies the second user account, the system further comprising computer-executable instructions to: provide the notification to the second device in response to the relationship between the first user account and the second user account.

Clause 7: The system of any of clauses 1 through 6, further comprising computer-executable instructions to: determine a first portion of the image that includes the item and a second portion of the image that includes a first background; remove the first background from the image; determine one or more colors included in the first portion of the image, wherein a first color of the one or more colors includes a hue value, a saturation value, and a brightness value; determine correspondence between the one or more colors and color data that associates at least one color of the one or more colors with a second color, wherein the second color includes one or more of the hue value, the saturation value, or the brightness value of the first color; and add a second background to the image that includes the second color.

Clause 8: A system comprising: one or more memories storing computer-executable instructions; and one or more hardware processors to execute the computer-executable instructions to: access purchase history data associated with a first user account, wherein the purchase history data is indicative of a plurality of purchases of a plurality of items associated with the first user account, and wherein a first purchase of the plurality of purchases is associated with a first item from a first seller and a second purchase of the plurality of purchases is associated with a second item from a second seller; determine, based on the purchase history data, characteristics for at least a subset of the plurality of items; determine first user interface data for generation of a first user interface that presents the at least a subset of the plurality of items and the characteristics, wherein the first user interface includes one or more of a list or a grid that sorts the at least a subset of the plurality of items based on at least one characteristic; provide the first user interface data to a first user device associated with the first user account for presentation of the first user interface; receive user input selecting at least one item of the plurality of items; based on the user input, determine second user interface data for generation of a second user interface that presents the at least one item; and provide the second user interface data to a second user device associated with a second user account.

Clause 9: The system of clause 8, further comprising computer-executable instructions to: determine, based on the purchase history data, one or more item identifiers indicative of the plurality of items; determine correspondence between the one or more item identifiers and item data that associates the one or more item identifiers with item characteristics to determine the characteristics associated with the at least a subset of the plurality of items.

Clause 10: The system of clause 9, further comprising computer-executable instructions to: receive at least a portion of the item data from a first seller device associated with the first seller and a second seller device associated with the second seller.

Clause 11: The system of any of clauses 8 through 10, wherein the characteristics include an image depicting the first item, the system further comprising computer-executable instructions to: determine a first portion of the image that includes the first item and a second portion of the image that includes a background; determine one or more colors included in the first portion of the image; determine correspondence between a first color of the one or more colors and color data that associates the first color with a second color; and replace at least a portion of the background with the second color.

Clause 12: The system of clause 11, further comprising computer-executable instructions to: determine that the first color in the first portion of the image corresponds to a third color indicated in the color data; determine that a quantity of the one or more of the first color or the third color in the first portion of the image exceeds a threshold saturation quantity; and wherein correspondence between the first color and the second color is determined in response to the quantity of the one or more of the first color or the third color exceeding the threshold saturation quantity.

Clause 13: The system of any of clauses 8 through 13, further comprising computer-executable instructions to: receive second user input from the first user device to make the second user interface accessible to one or more other user accounts; and receive third user input from a second user device associated with a second user account to access the second user interface; wherein the second user interface presents the at least one item at a first location positioned prior to a second location at which the data indicative of the one or more other items is presented, and wherein the second user interface includes a link that is accessible to one or more of initiate a purchase transaction for the at least one item or navigate to a webpage associated with the at least one item.

Clause 14: The system of clause 13, further comprising computer-executable instructions to: determine a purchase of the at least one item, wherein the purchase is associated with the second user account and occurs after providing the second user interface data to the second user device; and provide a notification indicative of the purchase to the first user device.

Clause 15: A method comprising: accessing first purchase history data associated with a first user account, wherein the first purchase history data is indicative of one or more purchases of one or more items; determining, based on the purchase history data, one or more characteristics for the one or more items; generating user interface data indicative of the one or more items and the one or more characteristics; determining a relationship between the first user account and a second user account; and providing at least a portion of the user interface data to a user device associated with the second user account.

Clause 16: The method of clause 15, further comprising: determining a purchase of an item, wherein the purchase is associated with the second user account and occurs within a threshold length of time after providing the at least a portion of the user interface data to the user device associated with the second user account; and providing a notification indicative of the purchase to a user device associated with the first user account.

Clause 17: The method of clause 15 or 16, further comprising: providing the user interface data to a user device associated with the first user account; receiving user input from the user device associated with the first user account, wherein the user input indicates a first portion of the user interface data to be accessible to other user accounts and the at least a portion of the user interface provided to the user device associated with the second user account includes the first portion of the user interface data and excludes a second portion of the user interface data.

Clause 18: The method of any of clauses 15 through 17, further comprising: determining correspondence between the first purchase history data and second purchase history data indicative of a second plurality of purchases associated with the second user account; determining, based on the correspondence, that similarity between first purchases of items associated with the first user account and second purchases of items associated with the second user account exceed a threshold similarity; and determining the relationship between the first user account and the second user account based on the similarity exceeding the threshold similarity.

Clause 19: The method of any of clauses 15 through 18, further comprising: based on the relationship, presenting data indicative of an item associated with the at least a portion of the user interface data provided to the user device associated with the second user account at a first location positioned prior to a second location that includes data indicative of one or more other items.

Clause 20: The method of any of clauses 15 through 19, further comprising: including, in the user interface, a control associated with an item, wherein actuation of the control one or more of: initiates a purchase transaction associated with the item or navigates to a user interface associated with the item.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    one or more memories storing computer-executable instructions; and
    one or more hardware processors to execute the computer-executable instructions to:
        access one or more of: a purchase communication associated with an electronic mail account, website data associated with one or more sellers of items, or sale data associated with one or more point of sale systems;
        determine purchase history data based on data associated with the one or more of the purchase communication, website data, or sale data, wherein the purchase history data is associated with a first user account and is indicative of a plurality of purchases associated with the first user account, and wherein a first purchase of the plurality of purchases is associated with a first item from a first seller and a second purchase of the plurality of purchases is associated with a second item from a second seller that differs from the first seller;
        determine, based on the purchase history data, one or more first characteristics for at least a subset of a plurality of items associated with the plurality of purchases;
        determine, based on item data from one or more seller devices associated with one or more of the first seller or the second seller, one or more second characteristics for the at least a subset of the plurality of items;
        determine first user interface data for generation of a first user interface that presents the at least a subset of the plurality of items, the one or more first characteristics, and the one or more second characteristics, wherein the first user interface arranges the at least a subset of the plurality of items based on the one or more first characteristics and the one or more second characteristics;
        provide the first user interface data to a first user device associated with the first user account;
        receive user input selecting at least one item of the plurality of items;
        determine a subset of the one or more first characteristics and the one or more second characteristics that correspond to the at least one item;
        based on the user input, determine second user interface data for generation of a second user interface that presents the at least one item and the subset of the one or more first characteristics and the one or more second characteristics; and
        provide, to a second user device associated with a second user account, access to the second user interface.

2. The system of claim 1, further comprising computer-executable instructions to:
    determine, based on the purchase history data, one or more item identifiers indicative of the plurality of items; and
    determine the one or more second characteristics based on correspondence between the one or more item identifiers and the item data, wherein the item data associates the one or more item identifiers with the one or more second characteristics that are associated with the at least a subset of the plurality of items.

3. The system of claim 2, further comprising computer-executable instructions to:
    receive at least a portion of the item data from a first seller device associated with the first seller and a second seller device associated with the second seller.

4. The system of claim 1, wherein one or more of the one or more first characteristics or the one or more second characteristics include a first image depicting the first item, the system further comprising computer-executable instructions to:
    determine a first portion of the first image that includes the first item and a second portion of the first image that includes a first background;
    determine one or more colors included in the first portion of the first image;
    determine correspondence between a first color of the one or more colors and color data that associates the first color with a second color; and
    generate a second image that includes the first portion of the first image and a second background that includes the second color.

5. The system of claim 4, further comprising computer-executable instructions to:
   determine that the first color in the first portion of the first image corresponds to a third color indicated in the color data;
   determine that a saturation quantity of one or more of the first color or the third color in the first portion of the first image exceeds a threshold saturation quantity; and
   wherein correspondence between the first color and the second color is determined in response to the saturation quantity of the one or more of the first color or the third color exceeding the threshold saturation quantity.

6. The system of claim 1, further comprising computer-executable instructions to:
   receive second user input from the first user device to make the second user interface accessible to the second user account; and
   receive third user input from the second user device associated with the second user account to access the second user interface;
   wherein the second user interface presents the at least one item at a first location in the second user interface that is positioned prior to a second location in the second user interface, the second location includes data indicative of one or more other items, and the second user interface includes a link that is accessible to one or more of: initiate a purchase transaction for the at least one item, or navigate to a webpage associated with the at least one item.

7. The system of claim 6, further comprising computer-executable instructions to:
   determine a purchase of the at least one item, wherein the purchase is associated with the second user account and occurs after providing the access to the second user interface to the second user device; and
   provide a notification indicative of the purchase to the first user device.

8. A method comprising:
   accessing a first source of data indicative of one or more purchases of one or more items associated with a first user account;
   accessing a second source of data indicative of the one or more purchases;
   determining first purchase history data associated with the first user account, based on the data indicative of the one or more purchases of the one or more items from the first source and the second source;
   determining, based on the first purchase history data, one or more first characteristics for the one or more items;
   generating first user interface data indicative of the one or more items and the one or more first characteristics;
   receiving user input indicative of a first subset of the one or more items;
   generating second user interface data indicative of the first subset of the one or more items;
   determining a relationship between the first user account and a second user account; and
   providing, to a first user device associated with the second user account, access to a user interface associated with the second user interface data.

9. The method of claim 8, further comprising:
   determining a purchase of an item, wherein the purchase is associated with the second user account and occurs within a threshold length of time after providing the access to the user interface to the first user device associated with the second user account; and
   providing a notification indicative of the purchase to a second user device associated with the first user account.

10. The method of claim 8, further comprising:
    providing the first user interface data to a second user device associated with the first user account; and
    receiving the user input from the second user device associated with the first user account, wherein the user input that indicates the first subset of the one or more items excludes a second subset of the one or more items.

11. The method of claim 8, further comprising:
    determining correspondence between the first purchase history data and second purchase history data indicative of a plurality of purchases associated with the second user account;
    determining, based on the correspondence, that a level of similarity between the one or more purchases associated with the first user account and the plurality of purchases associated with the second user account exceeds a threshold level of similarity; and
    determining the relationship between the first user account and the second user account based on the level of similarity exceeding the threshold level of similarity.

12. The method of claim 8, further comprising:
    determining data indicative of an item associated with the second user interface data; and
    causing the first user device associated with the second user account to present the data indicative of the item at a first location of the user interface, wherein the first location is positioned prior to a second location of the user interface that includes data indicative of one or more other items.

13. The method of claim 8, wherein the second user interface data includes data for presenting a control associated with an item, wherein actuation of the control one or more of: initiates a purchase transaction associated with the item, or navigates to the user interface associated with the item.

14. A system comprising:
    one or more memories storing computer-executable instructions; and
    one or more hardware processors to execute the computer-executable instructions to:
       determine purchase history data associated with a first user account, wherein the purchase history data is indicative of a first purchase of an item;
       determine one or more first characteristics of the item based on the purchase history data;
       determine one or more second characteristics of the item based on item data indicative of the one or more second characteristics of the item;
       determine first user interface data for causing a first device associated with the first user account to present a first user interface that includes at least a subset of one or more of the one or more first characteristics or the one or more second characteristics;
       provide the first user interface data to the first device;
       receive, from the first device, user input indicative of inclusion of an indication of the item in a second user interface;
       based on the user input, determine second user interface data for causing a second device associated with a second user account to present the second user interface, wherein the second user interface is indicative of the item and the at least a subset of the one or more of the one or more first characteristics or the one or more second characteristics; and provide access to the second user interface by the second device.

15. The system of claim 14, further comprising computer-executable instructions to:

determine, based on a source of a purchase communication associated with the first user account, that the purchase communication is associated with the first purchase of the item; and determine a portion of the purchase communication that includes an identifier of the item, wherein the item data associates the identifier with the one or more second characteristics and the one or more second characteristics are determined based on correspondence between the identifier and the item data.

16. The system of claim 14, further comprising computer-executable instructions to:

access website data associated with one or more sellers of items and with the first user account; and determine at least a portion of the purchase history data based on the website data.

17. The system of claim 14, further comprising computer-executable instructions to:

determine a relationship between the second user account and the first user account;

wherein the second user interface presents the item at a first location that is positioned prior to a second location, and the second location includes data associated with at least one other item, and wherein the second user interface includes a link that is accessible to one or more of: initiate a purchase transaction for the item, or navigate to a webpage associated with the item.

18. The system of claim 17, wherein the computer-executable instructions to determine the relationship include computer-executable instructions to:

determine that the purchase history data associated with the first user account corresponds to purchase history data associated with the second user account within a threshold level of similarity.

19. The system of claim 14, further comprising computer-executable instructions to:

determine a relationship between the second user account and the first user account;

determine a second purchase of the item associated with the second user account; and provide a notification indicative of the second purchase to the first device.

20. The system of claim 14, wherein the one or more of the one or more first characteristics or the one or more second characteristics include a first image depicting the item, the system further comprising computer-executable instructions to:

determine a first portion of the first image that includes the item and a second portion of the first image that includes a first background;

determine one or more colors included in the first portion of the first image;

determine correspondence between the one or more colors and color data that associates at least one color of the one or more colors with a second color; and generate a second image that includes the first portion of the first image and a second background that includes the second color.

* * * * *

UNITED STATES PATENT AND TRADEMARK OFFICE
CERTIFICATE OF CORRECTION

PATENT NO. : 11,301,939 B2
APPLICATION NO. : 16/399749
DATED : April 12, 2022
INVENTOR(S) : Haas et al.

It is certified that error appears in the above-identified patent and that said Letters Patent is hereby corrected as shown below:

In the Claims

Column 38, Claim 3, Line 46:
Currently reads "The system of claim 2,"
Where it should read --The system of claim 1,--.

Signed and Sealed this
Fourteenth Day of June, 2022

*Katherine Kelly Vidal*
Katherine Kelly Vidal
*Director of the United States Patent and Trademark Office*